US011449682B2

(12) United States Patent
Galitsky

(10) Patent No.: US 11,449,682 B2
(45) Date of Patent: Sep. 20, 2022

(54) ADJUSTING CHATBOT CONVERSATION TO USER PERSONALITY AND MOOD

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 249 days.

(21) Appl. No.: 16/869,013

(22) Filed: May 7, 2020

(65) Prior Publication Data

US 2021/0064827 A1 Mar. 4, 2021

Related U.S. Application Data

(60) Provisional application No. 62/893,525, filed on Aug. 29, 2019.

(51) Int. Cl.
*G06F 40/35* (2020.01)
*H04L 51/02* (2022.01)
(Continued)

(52) U.S. Cl.
CPC ............ *G06F 40/35* (2020.01); *G06F 40/284* (2020.01); *G06N 5/04* (2013.01); *G06N 20/00* (2019.01); *H04L 51/02* (2013.01)

(58) Field of Classification Search
CPC ........ G06F 40/00; G06F 40/284; G06F 40/35; G06N 20/00; G06N 5/00; G06N 5/003;
(Continued)

(56) References Cited

U.S. PATENT DOCUMENTS 5,495,605 A 2/1996 Cadot
6,112,168 A 8/2000 Corston et al.
(Continued)

FOREIGN PATENT DOCUMENTS

WO WO-2020214011 A1 * 10/2020

OTHER PUBLICATIONS

Sumedha Kshirsagar, A multilayer personality model, Jun. 2002, SMARTGRAPH '02: Proceedings of the 2nd international symposium on Smart graphics; p. 107-115, 2002 (Year: 2002).*
(Continued)

*Primary Examiner* — Angela A Armstrong
(74) *Attorney, Agent, or Firm* — Kilpatrick Townsend & Stockton LLP

(57) ABSTRACT

Systems, devices, and methods provide improved autonomous agents that are configured to respond to a user's query based on an emotion with which the query was expressed and a personality trait of the user. The agent may identify candidate answers to the query that are each associated with an emotion and/or a personality trait. The autonomous agent may utilize a predefined protocol set that indicates transitions between emotional states. A transition may correspond to an action associated with an emotion and/or a personality trait that, if performed, is likely to maintain a user in or transition the user to a preferred emotional state. The responses may be scored based at least in part their corresponding emotions and/or personality traits and in light of the transitions identified in the protocol set. A particular scored response may be selected and provided to the user in response to their query.

20 Claims, 9 Drawing Sheets

(51) Int. Cl.
  *G06F 40/284* (2020.01)
  *G06N 20/00* (2019.01)
  *G06N 5/04* (2006.01)
(58) Field of Classification Search
  CPC .......... G06N 5/04; G06L 15/00; G10L 25/00; H04L 51/02
  See application file for complete search history.

(56) References Cited

U.S. PATENT DOCUMENTS

| | | | |
|---|---|---|---|
| 6,181,909 | B1 | 1/2001 | Burstein et al. |
| 6,731,307 | B1 | 5/2004 | Strubbe et al. |
| 7,152,031 | B1 | 12/2006 | Jensen et al. |
| 7,519,529 | B1 | 4/2009 | Horvitz |
| 7,840,556 | B1 | 11/2010 | Dayal et al. |
| 9,037,464 | B1 | 5/2015 | Mikolov et al. |
| 9,292,490 | B2 | 3/2016 | Kimelfeld et al. |
| 9,390,706 | B2* | 7/2016 | Gustafson .............. G10L 15/19 |
| 9,559,993 | B2 | 1/2017 | Palakovich et al. |
| 9,582,501 | B1 | 2/2017 | Salmon et al. |
| 10,019,716 | B1 | 7/2018 | Ainslie et al. |
| 10,052,769 | B2* | 8/2018 | Houssin .............. B25J 11/0005 |
| 10,079,029 | B2* | 9/2018 | Amini ..................... G10L 25/63 |
| 10,599,885 | B2 | 3/2020 | Galitsky |
| 10,679,011 | B2 | 6/2020 | Galitsky |
| 10,796,102 | B2 | 10/2020 | Galitsky |
| 2001/0007987 | A1 | 7/2001 | Igata |
| 2002/0040292 | A1 | 4/2002 | Marcu |
| 2002/0046018 | A1 | 4/2002 | Marcu et al. |
| 2003/0138758 | A1 | 7/2003 | Burstein et al. |
| 2004/0044519 | A1 | 3/2004 | Polanyi et al. |
| 2004/0148170 | A1 | 7/2004 | Acero et al. |
| 2005/0086592 | A1 | 4/2005 | Polanyi et al. |
| 2007/0073533 | A1 | 3/2007 | Thione et al. |
| 2007/0136284 | A1 | 6/2007 | Cobb et al. |
| 2007/0192306 | A1 | 8/2007 | Papakonstantinou et al. |
| 2007/0294229 | A1 | 12/2007 | Au |
| 2008/0096533 | A1* | 4/2008 | Manfredi .............. G06N 3/006 455/412.1 |
| 2008/0228467 | A1 | 9/2008 | Womack et al. |
| 2009/0100053 | A1 | 4/2009 | Boschee et al. |
| 2009/0248399 | A1 | 10/2009 | Au |
| 2010/0169359 | A1 | 7/2010 | Barrett et al. |
| 2011/0119049 | A1 | 5/2011 | Ylonen |
| 2011/0153673 | A1 | 6/2011 | Boschee et al. |
| 2013/0046757 | A1 | 2/2013 | Salvetti et al. |
| 2013/0204611 | A1 | 8/2013 | Tsuchida et al. |
| 2014/0040288 | A1 | 2/2014 | Galitsky |
| 2014/0122083 | A1 | 5/2014 | Xiaojiang |
| 2014/0136188 | A1 | 5/2014 | Wroczynski et al. |
| 2015/0039295 | A1 | 2/2015 | Soschen |
| 2015/0046492 | A1 | 2/2015 | Balachandran |
| 2015/0149461 | A1 | 5/2015 | Aguilar Lemarroy et al. |
| 2015/0161512 | A1 | 6/2015 | Byron et al. |
| 2016/0034457 | A1 | 2/2016 | Bradley et al. |
| 2016/0055240 | A1 | 2/2016 | Tur et al. |
| 2016/0085743 | A1 | 3/2016 | Haley |
| 2016/0086601 | A1 | 3/2016 | Chotimongkol et al. |
| 2016/0232152 | A1 | 8/2016 | Mahamood |
| 2016/0245779 | A1 | 8/2016 | Khalaj Amineh et al. |
| 2016/0246779 | A1 | 8/2016 | Ho et al. |
| 2016/0247068 | A1 | 8/2016 | Lin |
| 2017/0032053 | A1 | 2/2017 | LeTourneau |
| 2017/0116982 | A1 | 4/2017 | Gelfenbeyn et al. |
| 2017/0228368 | A1 | 8/2017 | Carter et al. |
| 2017/0286390 | A1 | 10/2017 | Yashpe et al. |
| 2018/0181648 | A1 | 6/2018 | Chen |
| 2018/0189385 | A1 | 7/2018 | Sun et al. |
| 2018/0314689 | A1 | 11/2018 | Wang et al. |
| 2018/0365228 | A1 | 12/2018 | Galitsky |
| 2019/0005027 | A1 | 1/2019 | He et al. |
| 2019/0057157 | A1 | 2/2019 | Mandal et al. |
| 2019/0103111 | A1 | 4/2019 | Tiwari et al. |
| 2019/0172454 | A1* | 6/2019 | Kitajima ................ G06F 3/167 |
| 2019/0251965 | A1* | 8/2019 | Dharne .................. G06F 3/167 |

OTHER PUBLICATIONS

Denecke K, May R, Deng Y. Towards Emotion-Sensitive Conversational User Interfaces in Healthcare Applications. Stud Health Technol Inform. Aug. 21, 2019;264:1164-1168. doi: 10.3233/SHTI190409. PMID: 31438108. (Year: 2019).*

Krausa, Mathias, and Stefan Feuerriegela. "Sentiment analysis based on rhetorical structure theory: Learning deep neural networks from discourse trees." arXiv preprint arXiv:1704.05228 (2017). (Year: 2017).*

R. Socher, A. Perelygin, J. Wu, J. Chuang, C. Manning, A. Ng and C. Potts. Recursive Deep Models for Semantic Compositionality Over a Sentiment Treebank. Conference on Empirical Methods in Natural Language Processing, 2013 (Year: 2013).*

Alm et al., "Emotions from Text: Machine Learning for Text-Based Emotion Prediction", In Proceedings of the Conference on Human Language Technology and Empirical Methods in Natural Language Processing (HLT '05). Association for Computational Linguistics, USA, Oct. 2005, pp. 579-586.

Mairesse et al., "Using Linguistic Cues for the Automatic Recognition of Personality in Conversation and Text", Journal of Artificial Intelligence Research 30, 2007, pp. 457-500.

Jain et al.,"EMIA: Emotion Model for Intelligent Agent", Journal of Intelligent Systems 24.4, 2015, pp. 449-465.

Gupta et al.,"Emotion Detection in Email Customer Care", AT&T Labs—Research, Inc., Proceedings of the NAACL HLT 2010 Workshop on Computational Approaches to Analysis and Generation of Emotion in Text, Association for Computational Linguistics, Jun. 2010, pp. 10-16.

Balahur et al., "Emotinet: A knowledge Base for Emotion Detection in Text Built on the Appraisal Theories", In International Conference on Application of Natural Language to Information Systems, Springer Berlin Heidelberg, Jun. 2011, pp. 27-39.

Vu et al., "Acquiring a Dictionary of Emotion-Provoking Events", In Proceedings of the 14th Conference of the European Chapter of the Association for Computational Linguistics, Apr. 26-30, 2014, pp. 128-132.

Thornton et al., "Mental Models Accurately Predict Emotion Transitions", Proceedings of the National Academy of Sciences, vol. 114, No. 23, Jun. 6, 2017, pp. 5982-5987. doi: 10.1073/pnas.1616056114.

Calefato et al., "EmoTxt: a Toolkit for Emotion Recognition from Text", 2017, retrieved from https://arxiv.org/abs/1708.03892, 2 pages.

2009 Annual Study: Global Cost of a Data Breach, Ponemon Institute, LLC, PGP, Apr. 2010, 36 pages.

Data Loss Prevention, Trend Micro, Available Online at: http://www.trendmicro.co.in/cloud-content/us/pdfs/business/datasheets/ds_data-loss-prevention.pdf, 2010, pp. 1-2.

Data Loss Prevention Products & Services, Symantec, Available Online at: https://www.symantec.com/products/dataloss-prevention, Accessed from Internet on Aug. 30, 2018, 6 pages.

Exploring Dialog Management for Bots, Chatbots Magazine, Available Online at: https://chatbotsmagazine.com/exploring-dialog management-for-bots-cbb8665a2fd3, Jul. 11, 2016, 7 pages.

Global Security Report 2010, Trustwave, Available Online at: https://www.trustwave.com/Resources/Library/Documents/2010-Trustwave-Global-Security-Report/, 2010, 49 pages.

Ignore, Deny, DownPlay: Accounts of Syrians from Douma Have No Place in Western Narrative, Russia Today, Available Online at: https://www.rt.com/news/425438-douma-witnesses-gas-attack-syria/, Apr. 28, 2018, pp. 1-8.

Malaysia Airlines Flight 17, Wikipedia, Available Online at: https://en.wikipedia.org/wiki/Malaysia_Airlines_Flight_17, Accessed from Internet on: May 3, 2018, pp. 1-38.

Shadow Chairman of Investigative Committee, Crime Russia, Available Online at: https://crimerussia.com/corruption/tenevoy-direktor-skr/, Aug. 25, 2016, 5 pages.

Welcome to Apache Lucene, Apache Lucene 7.5.0 and Apache Solr 7.5.0, Available Online at: www.lucene.apache.org, Jan. 11, 2018, 38 pages.

U.S. Appl. No. 15/975,683, Non-Final Office Action dated Mar. 19, 2020, 16 pages.

(56) References Cited

OTHER PUBLICATIONS

U.S. Appl. No. 15/975,683, Non-Final Office Action dated Oct. 31, 2019, 27 pages.
U.S. Appl. No. 15/975,683, Notice of Allowance dated Jun. 12, 2020, 17 pages.
U.S. Appl. No. 15/975,685, Non-Final Office Action dated Apr. 1, 2020, 23 pages.
U.S. Appl. No. 15/975,685, Non-Final Office Action dated Nov. 15, 2019, 23 pages.
U.S. Appl. No. 15/975,685, Notice of Allowance dated Jul. 24, 2020, 17 pages.
U.S. Appl. No. 16/010,091, Non-Final Office Action dated Nov. 18, 2019, 26 pages.
U.S. Appl. No. 16/010,091, Notice of Allowance dated Mar. 19, 2020, 13 pages.
U.S. Appl. No. 16/010,141, Final Office Action dated Jul. 30, 2020, 14 pages.
U.S. Appl. No. 16/010,141, Non-Final Office Action dated Feb. 24, 2020, 12 pages.
U.S. Appl. No. 16/010,156, Notice of Allowance dated Feb. 6, 2020, 13 pages.
U.S. Appl. No. 16/010,156, Notice of Allowance dated Nov. 7, 2019, 13 pages.
U.S. Appl. No. 16/145,702, Final Office Action dated May 6, 2020, 19 pages.
U.S. Appl. No. 16/145,702, Final Office Action dated Sep. 10, 2019, 25 pages.
U.S. Appl. No. 16/145,702, First Action Interview Office Action Summary dated Apr. 29, 2019, 8 pages.
U.S. Appl. No. 16/145,702, First Action Interview Pilot Program Pre-Interview Communication dated Feb. 7, 2019, 6 pages.
U.S. Appl. No. 16/145,702, Non-Final Office Action dated Feb. 5, 2020, 30 pages.
U.S. Appl. No. 16/145,702, Notice of Allowance dated Jul. 1, 2020, 15 pages.
U.S. Appl. No. 16/145,777, Non-Final Office Action dated Apr. 3, 2020, 18 pages.
U.S. Appl. No. 16/145,777, Notice of Allowance dated Jul. 15, 2020, 17 pages.
U.S. Appl. No. 16/260,930, Non-Final Office Action dated Aug. 12, 2020, 9 pages.
U.S. Appl. No. 16/260,939, Non-Final Office Action dated May 1, 2020, 10 pages.
U.S. Appl. No. 16/260,939, Notice of Allowance dated Jun. 12, 2020, 14 pages.
Adamic et al., Knowledge Sharing and Yahoo Answers: Everyone Knows Something, WWW2008/Refereed Track: Social Networks & Web 2.0—Analysis of Social Networks & Online Interaction, Apr. 2008, pp. 665-674.
Airenti et al., Conversation and Behavior Games in the Pragmatics of Dialogue, Cognitive Science, vol. 17, No. 2, Apr. 1993, pp. 197-256.
Allen et al., Analyzing Intention in Utterances, Artificial Intelligence, vol. 15, No. 3, Dec. 1980, pp. 143-178.
Amgoud et al., Representing and Reasoning about Arguments Mined from Texts and Dialogues, 13th European Conference, ECSQARU 2015, Jul. 2015, 10 pages.
Apotheloz et al., The Function of Negation in Argumentation, Journal of Pragmatics, vol. 19, Issue 1, Jan. 1993, pp. 23-38.
Banerjee et al., WikiWrite: Generating Wikipedia Articles Automatically, IJCAI, Available Online at: https://dl.acm.org/doi/10.5555/3060832.3061004, Jul. 2016, pp. 2740-2746.
Baroni et al., Cleaneval: A Competition for Cleaning Web Pages, Proceedings of the Sixth International Language Resources and Evaluation (LREC'08), Available Online at: https://www.kilgarriff.co.uk/Publications/2008-BaroniChantreeKilgSharoff-LREC-cleaneval.pdf, May 2008, 6 pages.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Technical Report 774, Apr. 2002, 56 pages.
Blaylock et al., Managing Communicative Intentions with Collaborative Problem Solving, Current and New Directions in Discourse and Dialogue, Chapter—4, 2003, pp. 63-84.
Blei et al., Latent Dirichlet Allocation, Journal of Machine Learning Research 3, Available Online at: https://jmlr.org/papers/volume3/blei03a/blei03a.pdf, 2003, pp. 993-1022.
Boyer et al., MJRTY—A Fast Majority Vote Algorithm, Chapters, Automated Reasoning, 1991, pp. 105-117.
Bridle, Training Stochastic Model Recognition Algorithms as Networks Can Lead to Maximum Mutual Information Estimation of Parameters, Advances in Neural Information Processing Systems 2, Available Online at: http://papers.neurips.cc/paper/195-training-stochastic-model-recognition-algorithms-as-networks-can-lead-to-maximum-mutual-information-estimation-of-parameters.pdf, Jan. 1989, pp. 211-217.
Cai et al., Extracting Content Structure for Web Pages based on Visual Representation, vol. 2642 of LNCS, Available Online at: https://www.researchgate.net/publication/221239815_Extracting_Content_Structure_for_Web_Pages_Based_on_Visual_Representation, Apr. 2003, pp. 406-417.
Carlson et al., Discourse Tagging Reference Manual, Available Online at: https://www.isi.edu/~marcu/discourse/tagging-ref-manual.pdf, Sep. 11, 2001, 87 pages.
Chali et al., Complex Question Answering: Unsupervised Learning Approaches and Experiments, Journal of Artificial Intelligence Research, vol. 35, May 2009, pp. 1-47.
Chen, Understanding Mental States in Natural Language, Proceedings of the 8th International Conference on Computational Semantics, Jan. 2009, pp. 61-72.
Chesnevar et al., Empowering Recommendation Technologies Through Argumentation, Argumentation in Artificial Intelligence, Jan. 2009, pp. 403-421.
Cohen, Enron Email Dataset, Available Online at: https://www.cs.cmu.edu/~enron/, Jul. 10, 2016, 1 page.
Cohen et al., Intention is Choice with Commitment, Artificial Intelligence, vol. 42, Nos. 2-3, Mar. 1990, pp. 213-261.
Collins et al., New Ranking Algorithms for Parsing and Tagging: Kernels Over Discrete Structures, and the Voted Perceptron, Proceedings of the 40th Annual Meeting of the Association for Computational Linguistics (ACL), Jul. 2002, pp. 263-270.
Cristea et al., Veins Theory: A Model of Global Discourse Cohesion and Coherence, In C. Boitet & P. Whitelock (Eds ), 17th International Conference on Computational Linguistics, Aug. 1998, pp. 281-285.
Croft et al., Search Engines—Information Retrieval in Practice, Pearson Education, 2010, 542 pages.
De Boni, Using Logical Relevance for Question Answering, Journal of Applied Logic, vol. 5, No. 1, Mar. 2007, pp. 92-103.
De Mori et al., Spoken Language Understanding, Institute of Electrical and Electronics Engineers Signal Processing Magazine, vol. 25, No. 3, May 2008, pp. 50-58.
Dijkstra, Programming Considered as a Human Activity, Proceedings IFIP Congress, 1965, 7 pages.
Ebrahim, NLP Tutorial Using Python NLTK (Simple Examples), Dzone, Sep. 24, 2017, pp. 1-10.
Endres-Niggemeyer et al., Summarizing Text for Intelligent Communication, Dagstuhl Seminar Report 79, 1995, 36 pages.
Feng et al., A Linear-Time Bottom-Up Discourse Parser with Constraints and Post-Editing, Proceedings of the 52nd Annual Meeting of the Association for Computational Linguistics, Jun. 23-25, 2014, pp. 511-521.
Feng et al., Classifying Arguments by Scheme, Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.

(56) References Cited

OTHER PUBLICATIONS

Feng, RST-Style Discourse Parsing and Its Applications in Discourse Analysis, University of Toronto, Jun. 2015, 89 pages.
Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.
Ferraiolo et al., Role-Based Access Controls, Proceedings of the 15th NIST-NSA National Computer Security Conference, Oct. 13-16, 1992, 11 pages.
Finn, A Question Writing Algorithm, Journal of Reading Behavior, VII, vol. 4, 1975, pp. 341-367.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Galitsky et al., A Novel Approach for Classifying Customer Complaints Through Graphs Similarities in Argumentative Dialogues, Decision Support Systems, vol. 46, No. 3, Feb. 2009, pp. 717-729.
Galitsky, A Tool for Efficient Content Compilation, Proceedings of COLING 2016, the 26th International Conference on Computational Linguistics: System Demonstrations, Available Online at: https://www.aclweb.org/anthology/C16-2042.pdf, Dec. 11-17, 2016, pp. 198-202.
Galitsky et al., A Web Mining Tool for Assistance with Creative Writing, Conference: Proceedings of the 35th European conference on Advances in Information Retrieval, Mar. 2013, pp. 828-831.
Galitsky et al., Analyzing Conflicts with Concept-Based Learning, F. Dau, M.-L. Mugnier, G. Stumme (Eds ): ICCS 2005, LNAI 3596, 2005, pp. 307-322.
Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.
Galitsky et al., Concept-Based Learning of Human Behavior for Customer Relationship Management, Special Issue on Information Engineering Applications Based on Lattices. Information Sciences, vol. 181, Issue 10, May 15, 2011, pp. 2016-2035.
Galitsky et al., Detecting Logical Argumentation in Text via Communicative Discourse Tree, Journal of Experimental & Theoretical Artificial Intelligence, vol. 30, No. 5, May 2018, 29 pages.
Galitsky, Discovering Rhetorical Agreement between a Request and Response, Dialogue & Discourse, vol. 8, No. 2, Dec. 1, 2017, pp. 167-205.
Galitsky, Finding a Lattice of Needles in a Haystack: Forming a Query from a Set of Items of Interest, FCA4AI@IJCAI, Available Online at: https://www.researchgate.net/publication/283487911_Finding_a_lattice_of_needles_in_a_haystack_Forming_a_query_from_a_set_of_items_of_interest, Jan. 2015, 9 pages.
Galitsky et al., Finding Maximal Common Sub-Parse Thickets for Multi-Sentence Search, Graph Structures for Knowledge Representation and Reasoning, Jan. 2014, 19 pages.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, Jan. 2014, pp. 28-35.
Galitsky et al., Inferring the Semantic Properties of Sentences by Mining Syntactic Parse Trees, Data & Knowledge Engineering, vol. 81-82, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference "Dialogue 2017". Available Online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Application of AI, vol. 26, No. 3, Mar. 2013, 45 pages.
Galitsky, Matching Parse Thickets for Open Domain Question Answering, Data & Knowledge Engineering, vol. 107, Dec. 9, 2016, pp. 24-50.
Galitsky et al., Matching Sets of Parse Trees for Answering Multi-Sentence Questions, Proceedings of Recent Advances in Natural Language Processing, Sep. 7-13, 2013, pp. 285-293.
Galitsky, Natural Language Question Answering System: Technique of Semantic Headers, Advanced Knowledge International, vol. 2, Apr. 2003, 333 pages.
Galitsky et al., On a Chat Bot Finding Answers with Optimal Rhetoric Representation, Proceedings of Recent Advances in Natural Language Processing, Nov. 10, 2017, pp. 253-259.
Galitsky et al., Parse Thicket Representations for Answering Multi-Sentence Questions, 20th International Conference on Conceptual Structures, ICCS, 2013, 13 pages.
Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.
Galitsky et al., Style and Genre Classification by Means of Deep Textual Parsing, Computational Linguistics and Intellectual Technologies: Proceedings of the International Conference "Dialogue 2016", Jun. 1-4, 2016, pp. 1-45.
Galitsky et al., Text Classification Based on Deep Textual Parsing, Available Online at: http://ceur-ws.org/Vol-1886/paper_8.pdf, 2011, 9 pages.
Galitsky et al., Text Classification into Abstract Classes Based on Discourse Structure, Proceedings of Recent Advances in Natural Language Processing, Sep. 7-9, 2015, pp. 200-207.
Galitsky et al., Text Integrity Assessment: Sentiment Profile vs Rhetoric Structure, CICLing, Springer International Publishing, Apr. 2015, pp. 126-139.
Galitsky, Transfer Learning of Syntactic Structures for Building Taxonomies for Search Engines, Engineering Applications of Artificial Intelligence, vol. 26, Issue 10, Nov. 2013, pp. 2504-2515.
Galitsky, Using Extended Tree Kernels to Recognize Metalanguage in Text, Studies in Computational Intelligence, Feb. 2017, 25 pages.
Galitsky et al., Using Generalization of Syntactic Parse Trees for Taxonomy Capture on the Web, ICCS, Available Online at: https://rd.springer.com/chapter/10.1007/978-3-642-22688-5_8, Jul. 2011, pp. 104-117.
Garcia et al., Defeasible Logic Programming: An Argumentative Approach Alejandro Javier Garcia, Guillermo Ricardo Simari, Theory and Practice of Logic Programming, vol. 4, No. 2, Jan. 2004, pp. 95-138.
Gomez et al., CICBUAPnlp: Graph-Based Approach for Answer Selection in Community Question Answering Task, Proceedings of the 9th International Workshop on Semantic Evaluation (SemEval 2015), Jun. 4-5, 2015, pp. 18-22.
Gomez et al., Reasoning with Inconsistent Ontologies Through Argumentation, Applied Artificial Intelligence. vol. 24, Issue 1 and 2, Feb. 2010, pp. 102-148.
Grefenstette et al., Multi-Step Regression Learning for Compositional Distributional Semantics, Proceedings of the 10th International Conference on Computational Semantics, Jan. 30, 2013, 11 pages.
Grefenstette, Towards a Formal Distributional Semantics: Simulating Logical Calculi with Tensors, University of Oxford, Apr. 28, 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, 36 pages.

(56) References Cited

OTHER PUBLICATIONS

Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.

Harris, Sublanguage: Studies of Language in Restricted Semantic Domains, Discourse and Sublanguage, 1982, pp. 231-236.

Hart et al., Text Classification for Data Loss Prevention, Proceedings of the 11th International Conference on Privacy Enhancing Technologies, Jul. 27-29, 2011, 21 pages.

Haussler, Convolution Kernels on Discrete Structures UCSC-CRL-99-10, University of California, Santa Barbara Technical Report, Jul. 8, 1999, 38 pages.

Hendrikx et al., Procedural Content Generation for Games: A Survey, ACM Transactions on Multimedia Computing, Communications, and Applications, vol. 9, Issue 1, Article 1, Feb. 2013, pp. 1-22.

Hernault et al., A Sequential Model for Discourse Segmentation, International Conference on Intelligent Text Processing and Computational Linguistics, CICLing 2010: Computational Linguistics and Intelligent Text Processing, Mar. 21-27, 2010, pp. 315-326.

Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.

Iruskieta et al., A Qualitative Comparison Method for Rhetorical Structures: Identifying Different Discourse Structures in Multilingual Corpora, Lang Resources & Evaluation, vol. 49, No. 2, May 28, 2014, 47 pages.

Jansen et al., Discourse Complements Lexical Semantics for Non-Factoid Answer Reranking, Proceedings of the 52nd Annual Meeting of the Association for Computational Linguistics, vol. 1, Jun. 23-25, 2014, pp. 977-986.

John et al., Estimating Continuous Distributions in Bayesian Classifiers, Proceedings of the Eleventh Conference on Uncertainty in Artificial Intelligence, Aug. 18, 1995, 8 pages.

Johnson, Procedural Generation of Linguistics, Dialects, Naming Conventions and Spoken Sentences, Proceedings of 1 st International Joint Conference of DiGRA and FDG, 2016, 9 pages.

Johnson et al., The FrameNet Tagset for Frame-Semantic and Syntactic Coding of Predicate-Argument Structure, Proceedings of the First Meeting of the North American Chapter of the Association for Computational Linguistics, Apr. 2000, pp. 56-62.

Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.

Joty et al., CODRA: A Novel Discriminative Framework for Rhetorical Analysis, Computational Linguistics, vol. 41, No. 3, Sep. 1, 2015, pp. 385-435.

Joty et al., Combining Intra- and Multi-Sentential Rhetorical Parsing for Document-Level Discourse Analysis, 51st Annual Meeting of the Association for Computational Linguistics, vol. 1, Aug. 4-9, 2013, pp. 486-496.

Joty et al., Discriminative Reranking of Discourse Parses Using Tree Kernels, Proceedings of the 2014 Conference on Empirical Methods in Natural Language Processing, Oct. 25-29, 2014, pp. 2049-2060.

Jurafsky et al., Speech and Language Processing: An Introduction to Natural Language Processing, Computational Linguistics, and Speech Recognition, Pearson, Prentice Hall, 2000, pp. 719-761.

Karapalidis, Neural Storytelling: How AI is Attempting Content Creation, Available Online at: https://www.thedrum.com/opinion/2019/01/22/neural-storytelling-how-ai-attempting-content-creation, 2019, 9 pages.

Kate et al., Learning to Transform Natural to Formal Languages, Conference: Proceedings, The Twentieth National Conference on Artificial Intelligence and the Seventeenth Innovative Applications of Artificial Intelligence Conference, Jul. 2005, 7 pages.

Kipper et al., A Large-Scale Classification of English Verbs, Language Resources and Evaluation Journal, vol. 42, Dec. 2008, pp. 21-40.

Kipper et al., VerbNet Overview, Extensions, Mappings and Applications, Proceedings of Human Language Technologies, Annual Conference of the North American Chapter of the Association for Computational Linguistics, Companion, Volume: Tutorial Abstracts, Jun. 2009, pp. 13-14.

Kirschner et al., Linking the Thoughts: Analysis of Argumentation Structures in Scientific Publications, Proceedings of the 2nd Workshop on Argumentation Mining, Jun. 4, 2015, pp. 1-11.

Kohavi, A Study of Cross-Validation and Bootstrap for Accuracy Estimation and Model Selection, IJCAI'95: Proceedings of the 14th international joint conference on Artificial Intelligence, vol. 2, Aug. 20, 1995, 7 pages.

Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.

Kontos et al., Question Answering and Rhetoric Analysis of Biomedical Texts in the Aroma System, National and Kapodistrian University of Athens, Unpublished Manuscript, 2006, 6 pages.

Levinson, Presumptive Meanings: The Theory of Generalized Conversational Implicature, Cambridge, MA: The Massachusetts Institute of Technology Press, Jan. 2000, pp. 1-10.

Li et al., Recursive Deep Models for Discourse Parsing, Conference: Proceedings of the 2014 Conference on Empirical Methods in Natural Language Processing, Jan. 2014, 10 pages.

Liapis et al., Sentient Sketchbook: Computer-Aided Game Level Authoring, In Proceedings of ACM Conference on Foundations of Digital Games, 2013, 8 pages.

Lin et al., Recognizing Implicit Discourse Relations in the Penn Discourse Treebank, Conference: Proceedings of the 2009 Conference on Empirical Methods in Natural Language Processing, vol. 1, Aug. 6-7, 2009, pp. 343-351.

Litman et al., A Plan Recognition Model for Subdialogues in Conversations, Cognitive Science, vol. 11, No. 2, Apr. 1987, pp. 163-200.

Magnolini et al., FBK-HLT: A New Framework for Semantic Textual Similarity, Proceedings of the 9th International Workshop on Semantic Evaluation (SemEval 2015), Association for Computational Linguistics, Jun. 4-5, 2015, pp. 102-106.

Makhalova et al., Information Retrieval Chatbots Based on Conceptual Models, Available Online at: https://www.hse.ru/data/2020/03/25/1567345492/%D0%A1%D1%82%D0%B0%D1%82%D1%8C%D1%8F_chatbots.pdf, 2019, pp. 230-238.

Makhalova et al., News Clustering Approach Based on Discourse Text Structure, Proceedings of the First Workshop on Computing News Storylines, Association for Computational Linguistics and the Asian Federation of Natural Language Processing, Jul. 2015, pp. 16-20.

Makhalova et al., Pattern Structures for News Clustering, Proceedings of the 4th International Conference on What can FCA do for Artificial Intelligence, vol. 1430, Jul. 2015, pp. 35-42.

Malmi et al., Automatic Prediction of Discourse Connectives, Available Online at: https://arxiv.org/pdf/1702.00992.pdf, Proceedings of LREC, Feb. 1, 2018, 6 pages.

Mann, Discourse Structures for Text Generation, Proceedings of the 10th International Conference on Computational Linguistics and 22nd annual meeting on Association for Computational Linguistics, Jul. 2-6, 1984, pp. 367-375.

Mann et al., Rhetorical Structure Theory and Text Analysis, University of Southern California, Nov. 1989, 66 pages.

Mann et al., Rhetorical Structure Theory: Towards a Functional Theory of Text Organization, Text-Interdisciplinary Journal for the Study of Discourse, vol. 8, No. 3, Jan. 1988, pp. 243-281.

Marcu et al., An Unsupervised Approach to Recognizing Discourse Relations, Proceedings of the 40th Annual Meeting of the Association for Computational Linguistics (ACL), Jul. 2002, 8 pages.

Mercier et al., Why Do Humans Reason? Arguments for an Argumentative Theory, Behavioral and Brain Sciences, vol. 34, No. 2, Apr. 2011, pp. 57-111.

(56) References Cited

OTHER PUBLICATIONS

Mikolov et al., Distributed Representations of Words and Phrases and Their Compositionality, Advances in Neural Information Processing Systems, vol. 26, Oct. 16, 2013, pp. 1-9.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Apr. 11, 2011, pp. 1-22.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing? Proceedings of the Seventh International Association for the Advancement of Artificial Intelligence Conference on Weblogs and Social Media, Jan. 2013, pp. 409-418.
Muller et al., Constrained Decoding forText-Level Discourse Parsing, Proceedings of COLING 2012, Available Online at: https://www.aclweb.org/anthology/C12-1115.pdf, Dec. 2012, pp. 1883-1900.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
Pasternack et al., Extracting Article Text from the Web with Maximum Subsequence Segmentation, WWW 2009, Proceedings of the 18th International Conference on World Wide Web, 2009, pp. 971-980.
International Application No. PCT/US2018/031890, International Preliminary Report on Patentability dated Nov. 21, 2019, 9 pages.
International Application No. PCT/US2018/053392, International Preliminary Report on Patentability dated Apr. 9, 2020, 7 pages.
International Application No. PCT/US2018/053392, International Search Report and Written Opinion dated Dec. 17, 2018, 11 pages.
International Application No. PCT/US2019/015696, International Preliminary Report on Patentability dated Aug. 13, 2020, 8 pages.
International Application No. PCT/US2019/015696, International Search Report and Written Opinion dated Apr. 23, 2019, 12 pages.
International Application No. PCT/US2019/031580, International Search Report and Written Opinion dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 1, 2013, pp. 1-31.
Pendyala et al., Towards a Truthful World Wide Web from a Humanitarian Perspective, Institute of Electrical and Electronics Engineers 2015 Global Humanitarian Technology Conference, Oct. 8-11, 2015, 7 pages.
Ponti, Machine Learning Techniques Applied to Dependency Parsing, Available Online at: https://vision.unipv.it/AI/AIRG/MachineLearningTechniquesAppliedToDependencyParsingRevised.pdf, Oct. 2015, 45 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: One or More Dimensions? ISSCO Working Paper No. 62, University of Geneva, Nov. 2005, pp. 1-46.
Prasad et al., The Penn Discourse TreeBank 2.0., Proceedings of the Sixth International Conference on Language Resources and Evaluation (LREC'08), May 2008, pp. 2961-2968.
Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.
Radev et al., Centroid-Based Summarization of Multiple Documents: Sentence Extraction, Utility-Based Evaluation, 60 and User Studies, Proceedings of the 2000 NAACL-ANLPWorkshop on Automatic summarization—vol. 4 (NAACL-ANLP-AutoSum '00). Available Online at: https://doi.org/10.3115/1117575.1117578, Dec. 2000, 10 pages.
Rahwan et al., An Argumentation-based Approach for Practical Reasoning, In International Joint Conference on Autonomous Agents and Multi Agent Systems, May 2006, pp. 347-354.
Rayana et al., Collective Opinion Spam Detection: Bridging Review Networks and Metadata, Proceedings of the 21st Association for Computing Machinery Special Interest Group on Knowledge Discovery and Data Mining International Conference on Knowledge Discovery and Data Mining, Aug. 11-14, 2015, 10 pages.
Recasens et al., The Life and Death of Discourse Entities: Identifying Singleton Mentions, Proceedings of NAACL-HLT, Jun. 9-14, 2013, pp. 627-633.
Reed et al., Language Resources for Studying Argument, Proceedings of the 6th Conference on Language Resources and Evaluation, LREC2008, ELRA, May 2010, pp. 2613-2618.
Reichman, Getting Computers to Talk Like You and Me, Discourse Context, Focus and Semantics (An ATN Model), Massachusetts Institute of Technology Press, Jul. 1985, 17 pages.
Salton et al., On the Specification of Term Values in Automatic Indexing, Journal of Documentation, vol. 29, No. 4, Apr. 1, 1973, 35 pages.
Salton et al., Term Weighting Approaches in Automatic Text Retrieval, Information Processing & Management, vol. 24, No. 5, Nov. 1987, 22 pages.
Santhosh et al., Discourse Based Advancement on Question Answering System, International Journal on Soft Computing, Artificial Intelligence and Applications, vol. 1, No. 2, Oct. 2012, pp. 1-12.
Sauper et al., Automatically Generating Wikipedia Articles: A Structure-Aware Approach, Proceedings of the Joint Conference of the 47th Annual Meeting of the ACL and the 4th International Joint Conference on Natural Language Processing of the AFNLP, Aug. 2009, pp. 208-216.
Scholman et al., A Step-Wise Approach to Discourse Annotation: Towards a Reliable Categorization of Coherence 64 Relations, Categories of Coherence Relations in Discourse Annotation, Dialogue & Discourse, vol. 7, No. 2, Feb. 2016, 28 pages.
Searle, Speech Acts: An Essay in the Philosophy of Language, Cambridge University Press, Jan. 1969, pp. 22-53.
Sidorov, Should Syntactic N-Grams Contain Names of Syntactic Relations? International Journal of Computational Linguistics and Applications, vol. 5, No. 1, 2014, pp. 139-158.
Sidorov, Syntactic Dependency Based N-grams in Rule Based Automatic English as Second Language Grammar Correction, International Journal of Computational Linguistics and Applications, vol. 4, No. 2, 2013, pp. 169-188.
Sjoera, The Linguistics Behind Chat Bots, iCapps, Available Online at: http://www.icapps.com/the-linguistics-behind-chatbots/, Feb. 22, 2017, 9 pages.
Socher et al., Learning Continuous Phrase Representations and Syntactic Parsing with Recursive Neural Networks, Proceedings of the NIPS Deep Learning and Unsupervised Feature Learning Workshop, Jan. 2010, pp. 1-9.
Sperber et al., Relevance: Communication and Cognition, Blackwell, Oxford and Harvard University Press, 1986, 331 pages.
Sun et al., Exploiting Product Related Review Features for Fake Review Detection, Mathematical Problems in Engineering, vol. 2016, No. 1, Article ID 4935792, Aug. 4, 2016, 8 pages.
Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.
Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.
Tai et al., Improved Semantic Representations from Tree-Structured Long Short-Term Memory Networks, Available Online at: https://arxiv.org/pdf/1503.00075.pdf, May 30, 2015, 11 pages.

(56) References Cited

OTHER PUBLICATIONS

Traum et al., Conversation Acts in Task-Oriented Spoken Dialogue, University of Rochester Computer Science, Computational Intelligence, vol. 8, No. 3, Jun. 1992, 31 pages.
Traum et al., Discourse Obligations in Dialogue Processing, Proceedings of the 32nd Annual Meeting on Association for Computational Linguistics, Jun. 27-30, 1994, pp. 1-8.
Traum, Rhetorical Relations, Action and Intentionality in Conversation, Proceedings ACL SIG Workshop on Intentionality and Structure in Discourse Relations, Jun. 1993, pp. 132-135.
Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.
Tsui, English Conversation, Describing English Language, Oxford University Press, 1994, 37 pages.
Uliyar, A Primer: Oracle Intelligent Bots, Powered by Artificial Intelligence, White Paper, Sep. 2017, pp. 1-28.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Vapnik, The Nature of Statistical Learning Theory, Springer Science, 1995, 201 pages.
Walker et al., Quantitative and Qualitative Evaluation of Darpa Communicator Spoken Dialogue Systems, Proceedings of the 39th Annual Meeting of the Association for Computational Linguistics, Jul. 6-11, 2001, 8 pages.
Wang et al., Kernel Based Discourse Relation Recognition with Temporal Ordering Information, Proceedings of the 48th Annual Meeting of the Association for Computational Linguistics, Jul. 11-16, 2010, pp. 710-719.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Wu et al., Enhancing Text Representation for Classification Tasks with Semantic Graph Structures, International Journal of Innovative Computing, Information and Control, vol. 7, No. 5, May 2011, pp. 2689-2698.
Wuchner et al., Data Loss Prevention Based on Data-Driven Usage Control, Proceedings of the Institute of Electrical and Electronics Engineers 23rd International Symposium on Software Reliability Engineering, Nov. 27-30, 2012, 10 pages.
Yao et al., Online Deception Detection Refueled by Real World Data Collection, Proceedings of Recent Advances in Natural Language Processing, Jul. 28, 2017, 10 pages.
Yessenalina et al., Compositional Matrix-Space Models for Sentiment Analysis, Proceedings of the 2011 Conference on Empirical Methods in Natural Language Processing, Jul. 27-31, 2011, pp. 172-182.
Zanzotto et al., Estimating Linear Models for Compositional Distributional Semantics, Proceedings of the 23rd International Conference on Computational Linguistics (COLING 2010), Aug. 23-27, 2010, pp. 1263-1271.
Zeilenga, Lightweight Directory Access Protocol (LDAP) Read Entry Controls, Standards Track, Network Working Group, IETF, RFC 4527, Jun. 2006, 8 pages.
Zhao et al., Facilitating Discourse Analysis with Interactive Visualization, Institute of Electrical and Electronics Engineers Transactions on Visualization and Computer Graphics, vol. 18, No. 12, Dec. 2012, 10 pages.

\* cited by examiner

| CHATBOT: USER: | INTROVERT | EXTRAVERT | NEUROTIC | EMOTIONALLY STABLE | OPENNESS TO EXPERIENCE |
|---|---|---|---|---|---|
| INTROVERT | 0.05 | 0.3 | 0.05 | 0.45 | 0.15 |
| EXTRAVERT | 0.1 | 0.1 | 0.35 | 0.25 | 0.2 |
| NEUROTIC | 0.05 | 0.25 | 0.15 | 0.5 | 0.05 |
| EMOTIONALLY STABLE | 0.1 | 0.3 | 0.05 | 0.3 | 0.25 |
| OPENNESS TO EXPERIENCE | 0.3 | 0.3 | 0.1 | 0.1 | 0.2 |

FIG. 4

ADJUSTING CHATBOT CONVERSATION TO USER PERSONALITY AND MOOD

CROSS-REFERENCE TO RELATED APPLICATIONS

This non-provisional application claims priority to U.S. Patent Application No. 62/893,525, entitled "Adjusting Chatbot Conversation to User Personality and Mood," filed on Aug. 29, 2019, the disclosure of which is herein incorporated by reference in its entirety for all purposes.

TECHNICAL FIELD

This disclosure is generally concerned with linguistics. More specifically, this disclosure relates to using communicative discourse trees to perform discourse analysis.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF DESCRIPTION OF THE DRAWINGS

FIG. 4 depicts a table illustrating complementary personality traits, in accordance with at least one embodiment.

DETAILED DESCRIPTION

Figure 1:
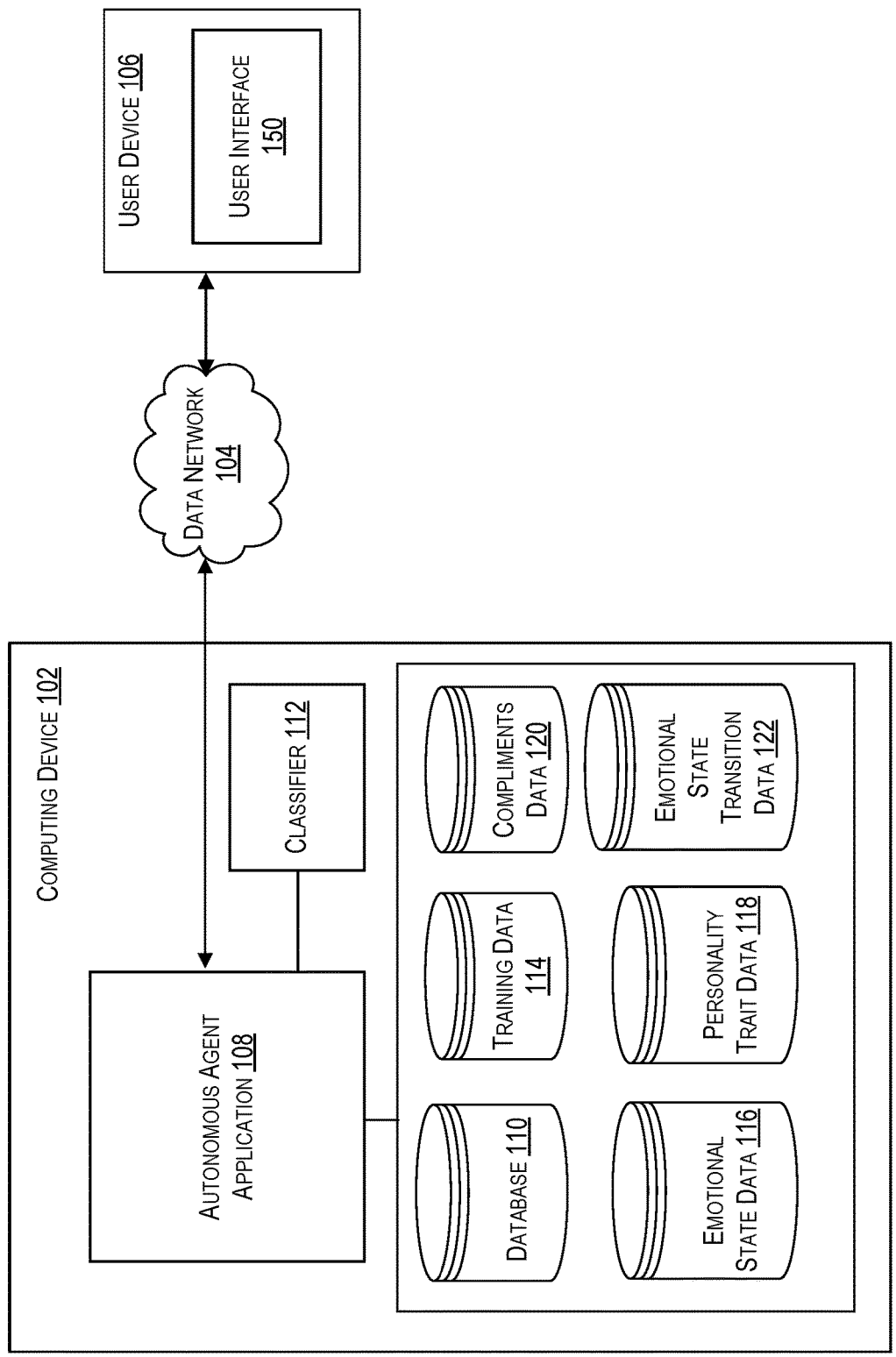
FIG. 1 depicts autonomous agent environment, in accordance with at least one embodiment.

Aspects disclosed herein provide technical improvements to the area of computer-implemented linguistics. More specifically, certain aspects identify a personality trait of a user and/or an emotion with which an utterance was provided to facilitate dialog management between autonomous agents ("chatbots") and the user. Dialogue management can refer to a process of receiving inputs from a user device and making decisions based on those inputs in a manner that is consistent with user expectations. Accordingly, by using the techniques provided herein, autonomous agents (also referred to as "autonomous agent applications") can provide dialog that complements the personality and mood of the user (as indicated by the emotion with which a user's input was given).

Presentation of knowledge in dialogue format is a popular way to communicate information effectively. It has been demonstrated in games, news, commercials, and educational entertainment. Usability studies have shown that for information acquirers, dialogues often communicate information more effectively than monologue most of times.

Systems disclosed herein implement autonomous agents that can deliver content in the form of a virtual dialogue. A virtual dialogue is defined as a multi-turn adversarial argumentation dialogue between imaginary agents obtained as a result of content transformation. Virtual dialogue is designed with the goal of effective information representation and is intended to look as close as possible to a genuine dialogue about a topic. An experienced agent should be able to manage the proper sentiment tonality and language in conversation, empathizing and otherwise pacing and leading the user to create and maintain a state of confidence that the user's problem will be resolved or that their question will be answered. On the other hand, a single slip by the agent can send the user into a state of irritation, anger, or betrayal, for example. The disclosed autonomous agents can manage the dialog provided to a user by ascertaining one or more personality traits of the user and/or an emotion with which the user provided input (e.g., an utterance, textual input, etc.) such that an agent can match and/or complement the emotion and/or personality of the user with the dialog it provides. In human-chatbot interactions, the ability to detect signs of human emotions and to properly react to them can enrich communication. For example, display of empathetic emotional expressions can enhance the user experience and lead to an increase in user satisfaction in an system. Empathetic computer agents can contribute to a more positive perception of the interaction, and many chatbot errors can be overlooked by the user if the chatbot is able to recognize the user's emotional state and responded to it sensitively.

In some embodiments, a user may provide an utterance comprising a query. The system may generate a discourse tree from the utterance. A discourse tree refers to a structure that represents the rhetorical relations for a sentence or part of a sentence. Rhetorical relations refer to how two segments of discourse are logically connected to one another. Examples of rhetorical relations include elaboration, contrast, and attribution. The theoretical underpinnings of discourse, Rhetoric Structure Theory (RST), can be attributed to Mann, William and Thompson, Sandra, "Rhetorical Structure theory: A Theory of Text Organization," Text-Interdisciplinary Journal for the Study of Discourse, 8(3): 243-281, 1988.

The discourse tree generated from the utterance can be used to identify an emotion with which the query was expressed and a personality trait of the user. By way of example, the discourse tree can be provided as input into one or more machine-learning models. In some embodiments, one model may be previously trained to identify emotions indicated in a provided discourse tree corresponding to an utterance (e.g., input provided by the user). Another model may be previously trained to identify one or more personality traits of the user based on a discourse tree corresponding to the utterance provided as input. It should be appreciated that any of the machine-learning models may be combined into fewer (e.g., a single) machine-learning model.

The system may maintain a data store of candidate answers (also referred to as "responses"). In some embodiments, the system may identify a set of candidate answers that are topically relevant to the query. Each candidate answer may be previously associated with an emotion and/or a personality trait. The system may maintain a protocol set can specify rules from which a complementary personality trait and/or emotion may be derived. In some embodiments, the protocol set may utilize predefined containers. One such container (e.g., a mapping) can specify pairs of complementary personality traits. Another container (e.g., a map, a mapping, etc.) can model or otherwise specify emotional state transitions from which a complementary emotion can be derived.

An answer (also referred to herein as a "response") associated with the complementary personality trait and/or the complementary emotion can be selected from the set of candidate answers and the answer may be provided to the user in response to their query. By utilizing the techniques provided herein, the autonomous agents can be configured to adapt its dialog to complement the user's personality and mood.

Turning now to the Figures, FIG. 1 depicts autonomous agent environment 100, in accordance with at least one embodiment. FIG. 1 depicts computing device 102, data network 104, and user device 106. Computing device 102 includes one or more of autonomous agent application 108, database 110.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

In an example, autonomous agent application 108 receives one or more queries from user device 106. Autonomous agent application 108 analyzes the query, identifies an emotion and/or personality trait of the user from the query, and provides a response that complements the emotion and/or personality trait of the user. In some embodiments, the database 110 stores any suitable data for performing the functions described herein.

In some aspects, machine learning is used by the autonomous agent application 108 to generate dialog based on the received query. For example, computing device 102 can include classifier 112. Classifier 112 can be previously trained utilizing the method described in FIG. 2.

Figure 2:
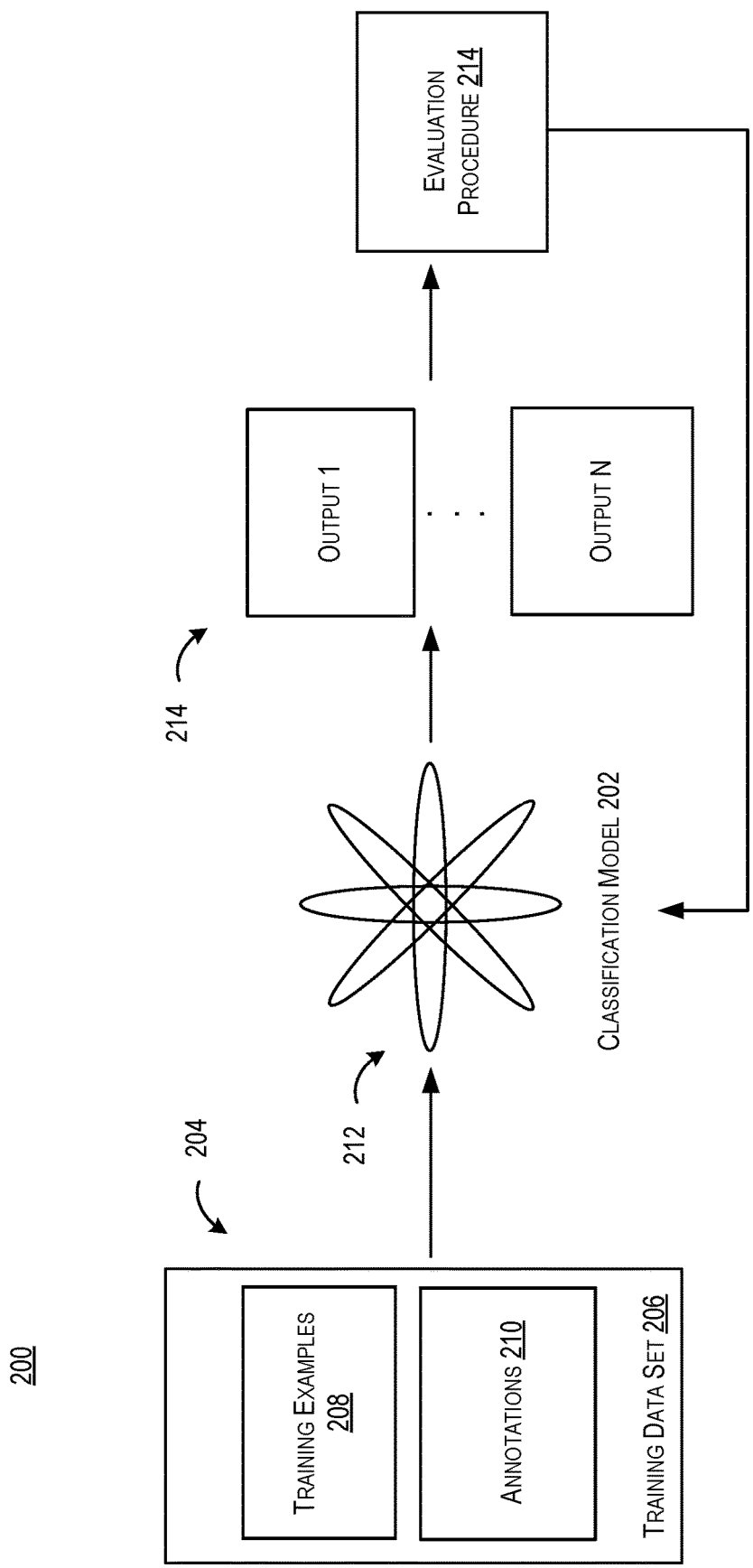
FIG. 2 includes a flowchart illustrating an example method for training a machine-learning model, in accordance with at least one embodiment.

FIG. 2 includes a flowchart illustrating an example method 200 for training a classification model 202 (e.g., the classifier 112 of FIG. 1), in accordance with at least one embodiment. The method 200 may be performed by the autonomous agent application 108 of FIG. 1 or the method 200 may be performed by a separate computing device and the classification model 202 may be accessible by the autonomous agent application 108.

In some embodiments, the method 200 may begin at 204, where training data set 206 may be obtained (e.g., from the database 110 of FIG. 1). Training data set 206 may include any suitable data with which the classification model 202 may be trained. By way of example, training data set 206 may include any suitable number of training examples 208 and annotations 210. When training the classifier 112 of FIG. 1, the training examples 208 may include examples of user queries and the annotations 210 may include answers that have been previously identified as corresponding to the user queries.

At 212, the classification model 202 may be generated based at least in part on executing a machine-learning algorithm on the training data set 206. Any suitable portion of the training data set 206 may be utilized to train the classification model 202. In some embodiments, the training may utilize any suitable supervised machine-learning technique. A supervised machine-learning technique is intended to refer to any suitable machine-learning algorithm that maps an input to an output based on example input-output pairs. A supervised learning algorithm (e.g., decision trees, distance functions such as nearest neighbor functions, regression analysis, etc.) may analyze the training data and produce an inferred function (also referred to as "a model" or a "classification model"), which can be used identifying an output for a subsequent input. The classification model 202 may be one example of an function that is inferred in this manner. By executing the supervised learning algorithm on the training data set 206, the classification model 202 may be trained to identify one or more answers (e.g., outputs 1-N) from a query provided as subsequent input.

In some embodiments, the classification model 202 may be evaluated for quality. By way of example, some portion of the training examples 208 may be provided to the classification model 202 to produce output at 214. The evaluation procedure 216 may be executed to determine whether the output provided at 214 matches the annotations 210 originally provided by the training data set 206. If classification model 202 produces output that matches the training data set 206 over some threshold amount (e.g., indicating 90% accuracy, 95% accuracy, etc.), the classification model 202 may be determined to be high enough quality to be utilized in real world scenarios.

It should be appreciated that, as the classification model 202 is used, subsequent examples provided as input and the corresponding output produced by the classification model 202 may be added to the training data set 206, which can improve the accuracy of the classification model 202 over time. In some embodiments, the accuracy of the example and the corresponding output of the model may be confirmed by a user before it is added to the training data set 206.

Returning to FIG. 1, emotional state data 116 may store emotions training data that includes example utterances (or discourse trees (DTs) generated from utterances) and/or responses (or discourse trees generated from those responses) that have been previously associated with a particular corresponding emotion. In some embodiments, the possible set of emotions may include happy, sad, fear, anger, disgust, surprise, or neutral, however any suitable number and combination of emotions may be similarly utilized. The emotional state data 116 may include an emotion classifier. An emotion classifier may be another example of a classification model (e.g., the classification model 202 of FIG. 2) any may be trained in a similar manner as the classifier 112. The emotional classifier may be trained using training data set 206. In this example, training examples 208 may include any suitable combination of utterances, DTs generated from utterances, responses, DT generated from responses, or the like. The annotations 210 of FIG. 2 may include emotion classification previously assigned to each example. In some embodiments, there may be multiple annotations for a given example indicating that there are multiple emotions exhibited by the example. Thus, the emotion classifier can identify more than one emotion from an utterance or response provided as input (or a DT generated from the utterance and/or response).

In some embodiments, emotional state data 116 may include a list of predefined words that indicate a particular emotion. In some embodiments, the autonomous agent application 108 may be configured to compare words of the query (or a potential response) to the predefined list. If multiple emotions correspond to one or more words of the query (or response) the autonomous agent application 108 may identify an emotion that is associated with the most words of the query (or response) and assign the query (or response) that emotion.

Personality is the complex combination of different attributes (behavioral, temperamental, emotional and mental) that characterize a given individual. Utterances can convey a great deal of information about the speaker in addition to their semantic content. One such type of information includes cues that indicates the speaker's personality traits. As used herein, personality traits can include "extraversion" and/or "introversion." Individuals with the extraversion personality trait tend to be outgoing, talkative, and exhibit energetic behavior, whereas individuals with the introversion trait may be more reserved and exhibit solitary behavior. Other example personality traits may include "emotional stability" and/or "neuroticism." Individuals with the neuroticism trait may have a long-term tendency to be in an insecure or anxious emotional state. In contrast, those with the emotional stability trait may appear to be calmer and/or unemotional. Personality traits can include "agreeableness" and/or "disagreeableness." An individual who exhibits the agreeableness trait may be friendly and cooperative, while an individual with the disagreeable trait may be antagonistic and/or fault finding. Personality traits can further include "conscientious" and/or "unconscientious." Individuals who are conscientious are generally more aware of the impact that their own behavior has on those around them. Conscientious people are generally more goal-oriented in their motives, ambitious in their academic efforts and at work, and feel more comfortable when they are well-prepared and organized. By contrast, individuals who are unconscientious fail to appreciate their impact and are more inefficient and/or careless. Personality traits can further include "openness to experience" and/or "close-minded." Some individuals may be open to experiences which can indicate intelligence and insight, while those who are not open to experiences are often shallow and unimaginative.

These personality traits can be indicated in the way a person speaks or writes. For example, the following table illustrates some linguistic cues of introverts and extroverts.

| Type | Introvert | Extravert |
| --- | --- | --- |
| Conversation | Listen | Initiate conversation |
| | Less back-channel behavior | More back-channel behavior |
| Topic selection | Self-focused | Not self-focused |
| | Use of Problem talk | Use of Pleasure talk |
| | Indication of dissatisfaction | Indication of agreement, |
| | Strict selection | Complement |
| | Single topic | Think out loud |
| | Few semantic errors | Many topics |
| | Few self-references | Many semantic errors |
| | | Many self-references |
| Style | Formal | Informal |
| | Many hedges (tentative words) | Few hedges (tentative words) |
| Syntax | Many nouns, adjectives, and prepositions | Many verbs, adverbs, and pronouns |
| | Elaborated constructions | Simple constructions |
| | Many words per sentence | Few words per sentence |
| | Many articles | Few articles |
| | Many negation | Few negations |
| Lexicon | Correct | Loose |
| | Rich | Poor |
| | High diversity | Low diversity |
| | Many exclusive and inclusive words | Few exclusive and inclusive words |
| | Few social words | Many social words |
| | Few positive emotion words | Many positive emotion words |
| | Many negative emotion words | Few negative emotion words |

Personality trait data 118 may store personality trait training data that includes example utterances (or discourse trees (DTs) generated from utterances) and/or responses (or discourse trees generated from those responses) that have been previously associated with a particular personality trait. In some embodiments, the possible set of personality traits may include extrovert, introvert, emotional stability, neuroticism, agreeableness, disagreeableness, conscientiousness, unconscientious, open to experiences, and close-minded, however any suitable number and combination of personality traits may be similarly utilized. The personality trait data 118 may include a personality trait classifier. A personality trait classifier may be another example of the classification model 202 of FIG. 2. The emotional classifier may be trained using training data set 206. In this example, the training examples 208 may include any suitable combination of utterances, DTs generated from utterances, responses, DT generated from responses, or the like. The annotations 210 of FIG. 2 may include a personality trait that has been previously assigned to each example. In some embodiments, there may be multiple annotations for a given example indicating that there are multiple personality traits exhibited by the example. Thus, the personality trait classifier can identify more than one personality trait from an utterance or response provided as input.

Personality trait data 118 may include one or more decision trees corresponding to one or more personality traits.

Figure 3:
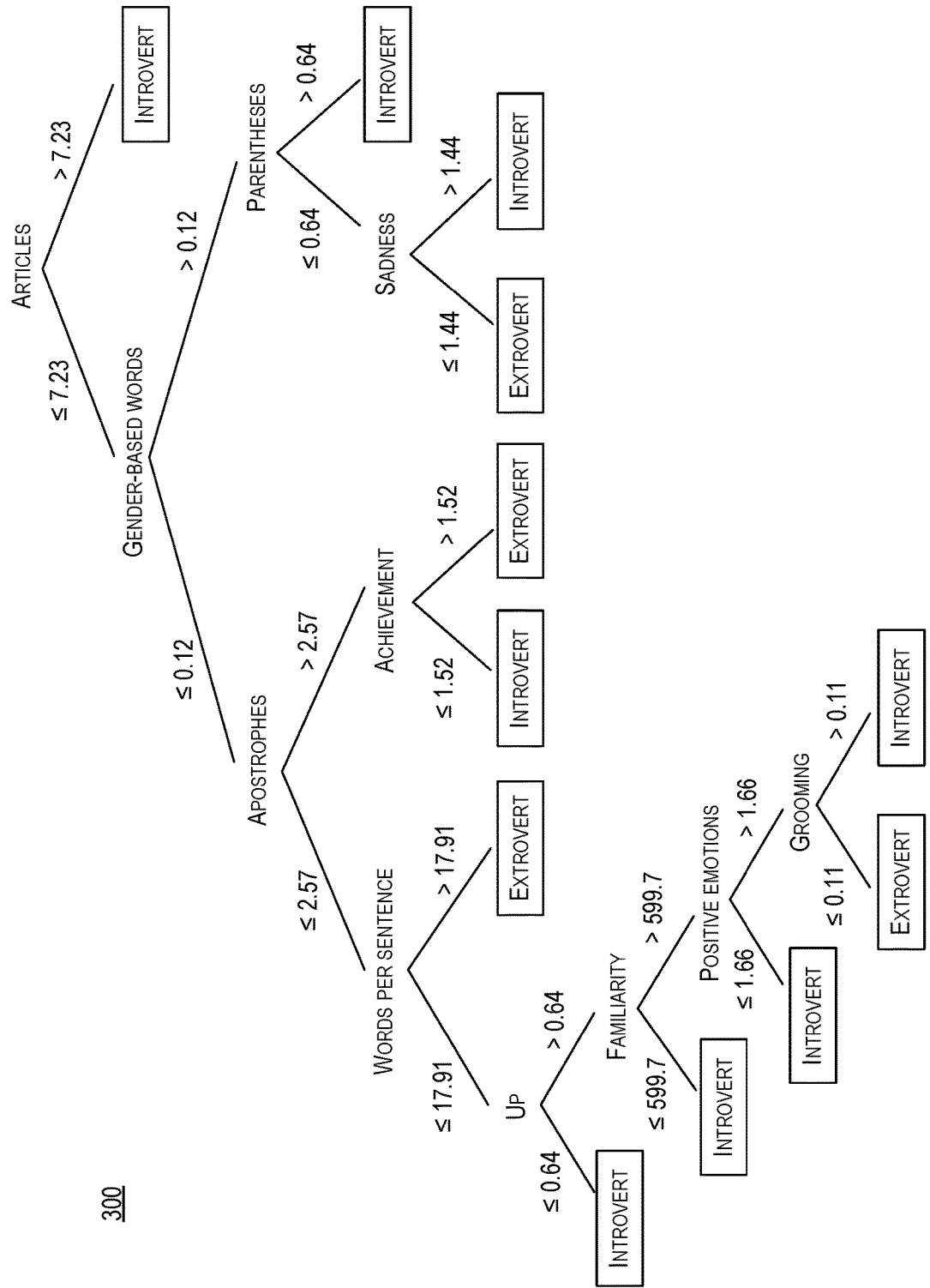
FIG. 3 depicts a binary decision tree for identifying a personality trait, in accordance with at least one embodiment.

FIG. 3 depicts a binary decision tree 300 for identifying a personality trait, in accordance with at least one embodiment. As depicted in FIG. 3, binary decision tree 300 may be utilized to identify whether a query or response is indicative of a speaker that is an extrovert or an introvert. Each node of the binary decision tree 300 corresponds to a different attribute of the input. By way of example, a query or response may be analyzed as input and a number of attributes of the query/response may be identified by the autonomous agent application 108. By way of example, the query/response may be analyzed to identify attributes such as: a number of articles, gender-based words, apostrophes, parenthesis, words associated with sadness, words associated with achievement, words per sentence, upbeat words, words associated with familiarity, words associated with positive emotions, words associated with grooming activities, and the like. The specific attributes identified from the query or response may vary and may be in accordance with a predetermined rule set. While binary decision tree 300 depicts attributes corresponding to deciding whether the query or response provided as input indicates a personality trait of extrovert or introvert, it should be appreciated that the binary decision tree 300 may be more complex and may include any suitable number of attributes corresponding to decisions between any suitable number of personality traits. A query and/or response may indicate more than one personality trait. In some embodiments, a separate decision tree for each pair of opposing personality traits (e.g., extrovert/introvert, emotional stability/neuroticism, agreeableness/disagreeableness, conscientiousness/unconscientious, open to experiences/not open to experiences), and the like may be maintained by the autonomous agent application 108. A query and/or response may be associated with one or more personality traits.

Returning to FIG. 1, complements data 120 may store data indicating one or more personality traits that have been previously determined to be complementary to a given personality trait.

FIG. 4 depicts a table 400 illustrating complementary personality traits, in accordance with at least one embodiment. Column 402 of the table 400 may include a set of personality traits of the user (e.g., as ascertained by a personality trait classifier and/or a decision tree as discussed above). Row 404 of the table 400 may include a set of personality traits to be potentially exhibited by the chatbot (e.g., the autonomous agent application 108). The autonomous agent application 108 of FIG. 1 may be configured to identify a complementary personality trait using one or more personality traits already identified for a query (or response).

For example, a discourse tree may be generated from a query and provided as input to a personality trait classifier which may identify the query as being indicative of a person that is an extravert and/or who is open to experiences. The autonomous agent application 108 may determine a complementary personality trait for the extravert personality trait of the user by identifying a highest value of the values of row 406 of table 400. In some embodiments, the numeric values of the table 400 may represent a percentage of the time for which a user having a given personality trait is to be provided a response that is indicative of another personality trait. By way of example, row 406 illustrates that an extravert should be responded to with a response indicative of an introvert 10 percent of the time, a response indicative of an extravert 10 percent of the time, a response indicative of an neurotic personality trait 35 percent of the time, response indicative of an emotionally stable personality trait 25 percent of the time, and a response indicative of an openness to experience 20 percent of the time.

Complements data 120 of FIG. 1 may include any suitable protocol set that defines a scheme for selecting a complementary personality trait based on a personality trait of the user. Thus, table 400 can be utilized to ensure that an extravert user (or extravert users) are provided an introverted response, extraverted response, neurotic response, emotionally stable response, and an openness to experience response in accordance with the percentages provided in table 400. The table 400 is used for illustration, it should be appreciated that the table 400 may include more or fewer personality traits. In some embodiments, the table 400 may rank and or score one or more other personality traits in an order of preference and a complementary personality trait may be identified in accordance with that ranking and/or score.

Returning to FIG. 1, complements data 120 may include one or more tables similar to table 400 of FIG. 4 that identify complementary emotions for a given emotion of the user. An emotion of a query (e.g., the user's utterance) may be identified by generated a discourse tree for the query. The discourse tree can be provided to an emotion classifier as discussed above which can identify the query as being indicative of one or more emotions. The identified emotions may be utilized to look up one or more complementary emotions in a similar manner as that discussed in connection with personality traits and table 400 of FIG. 4. A table may be utilized that maps one or more complementary emotions to a given emotion and/or ranks and/or one or more emotions as being, to some degree, complementary to a given emotion. As discussed in connection with FIG. 4, a table of complementary emotions can indicate a percentage of times that a query indicating a given emotion is to be provided a response indicative of another emotion. The emotional state data 116 of FIG. 1 can include any suitable protocol set that defines a set of rules for selecting a complementary emotion (e.g., utilizing a table of complementary emotions).

In some embodiments, an emotion for the response may be identified based at least in part on emotional state transition data 122.

Figure 5:
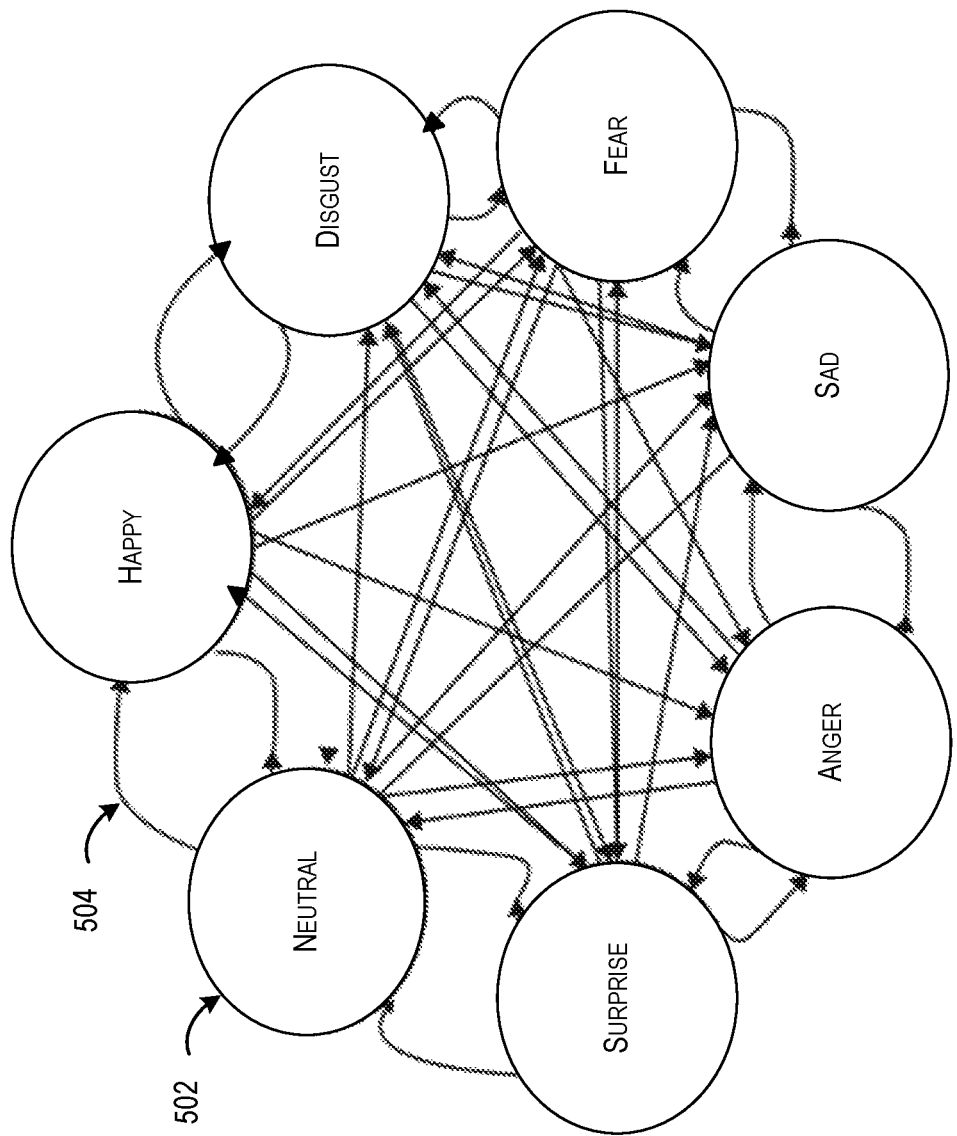
FIG. 5 illustrates an exemplary diagram illustrating emotional state transitions, in accordance with at least one embodiment.

FIG. 5 illustrates an exemplary diagram 500 illustrating emotional state transitions, in accordance with at least one embodiment. Diagram 500 may illustrate any suitable number of nodes corresponding to a set of emotions. As depicted, the set of emotions can include "happy," "disgust," "fear," "sad," "anger," "surprise," or "neutral," although a different, larger, or smaller set of emotions can be equally utilized. Each arrow of the diagram 500 may correspond an action. An action may be providing a response that is associated with a particular emotion. The arrows may indicate that if a corresponding action was performed, the user would likely be transitioned to a different emotional state.

As a non-limiting example, if a user is associated with a neutral emotional state (e.g., indicated at 502), an action associated with a happy emotional state, if performed, is likely to transition the user to a happy state (as indicated by arrow 504). Thus, each node and each arrow of the diagram 500 may be associated with an emotion corresponding to an action (e.g., presenting a response associated with a particular emotion). It should be appreciated that, in some embodiments, emotional state transitions may be stored in a different format such as a mapping, a tuple, a table, or any suitable container for indicating an emotional state of the user, an emotion associated with an action (e.g., providing a response that is associated with the emotion), and a likely resultant emotional state of the user if the action is performed.

Returning to FIG. 1, if the autonomous agent application 108 is not able to classify the query as being indicative of a particular emotion, a default emotion may be predefined and utilized for the query (e.g., "neutral").

Figure 6:
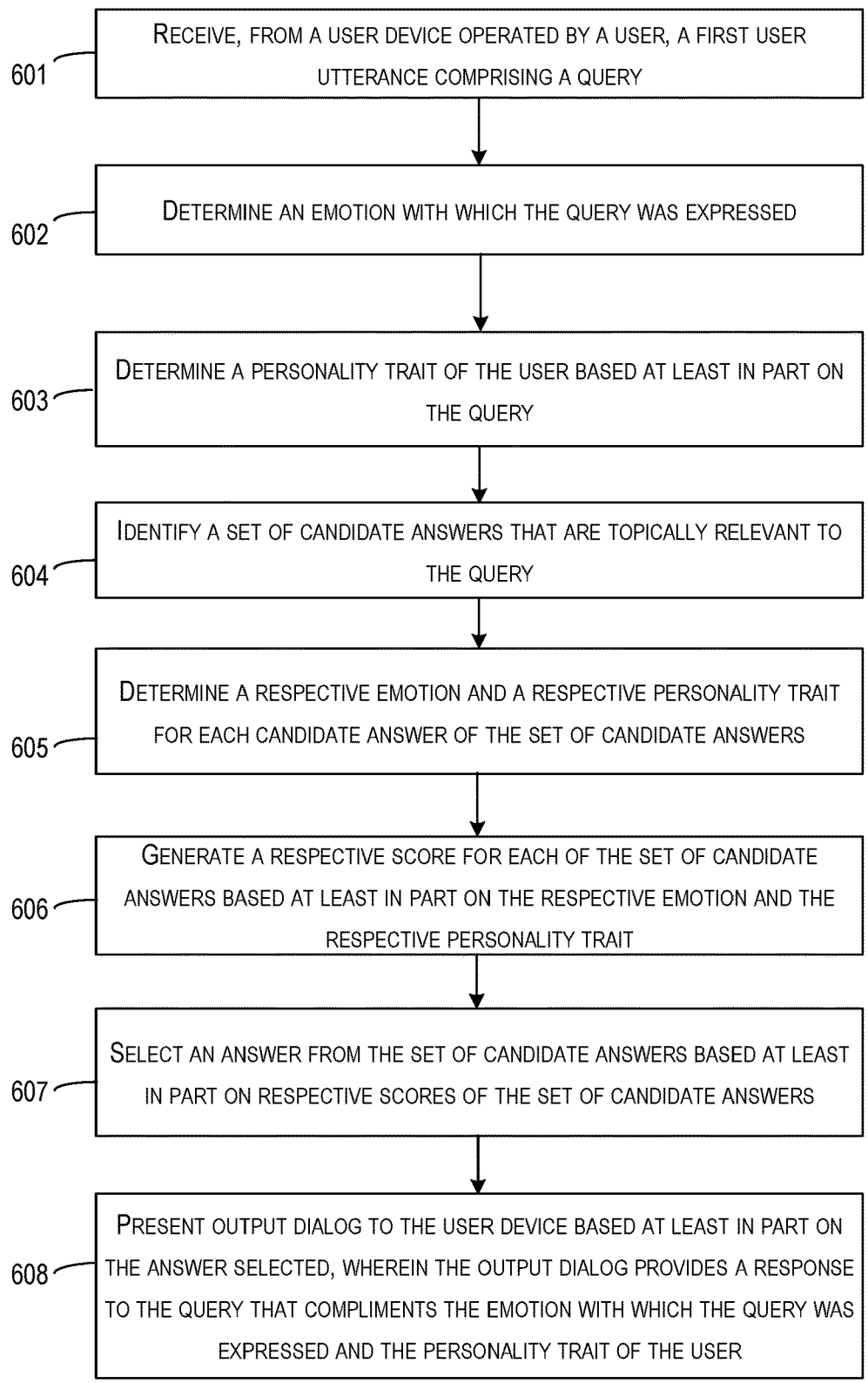
FIG. 6 illustrates an exemplary method for selecting a candidate answer to provide in response to a user's query, in accordance with at least one embodiment.

FIG. 6 illustrates an exemplary method for selecting a candidate answer to provide in response to a user's query, in accordance with at least one embodiment. Method 600 can be performed by autonomous agent application 108 of FIG. 1.

Method 600 may begin at block 601, where a first user utterance comprising a query may be received (e.g., from a user device operated by a user). The first user utterance may be any suitable length. The query may be a portion (or all) of the first user utterance.

At block 602, an emotion with which the query was expressed may be determined. In some embodiments, the autonomous agent application 108 can utilize conventional discourse analysis to generate a communicative discourse tree (referred to herein as a "discourse tree"). The discourse tree generated from the query can be a structure that represents the rhetorical relations between portions of the query. In some embodiments, the query and/or the discourse tree may be analyzed to identify one or more words from a list of predefined words that indicate one or more emotions. If a query includes words that correspond to more than one emotion, the emotion corresponding to the most words in the query may be selected and the query can be determined to have been expressed with that emotion. As another example, the discourse tree generated from the query may be provided to an emotion classifier (e.g., an example of the classification model 202 of FIG. 2). The emotion classifier may have been previously trained to identify one or more emotions from a discourse tree provided as input and corresponding to a query.

At block 603, a personality trait of the user may be determined based at least in part on the query. By way of example, the query can be analyzed to identify one or more attributes with which a decision tree (e.g., the binary decision tree 300 of FIG. 3) may be traversed in order to identify a personality trait of the user as described in connection with FIG. 3 above. In some embodiments, any suitable number of decision trees may be traversed to identify the query as being indicative of a user having any suitable number of personality traits. As another example, the discourse tree generated from the query may be provided as input to a personality trait model (e.g., an example of the classification model 202 of FIG. 2). The personality trait model may be previously trained to identify one or more personality traits of a user based on a discourse tree provided as input and corresponding to a query. It should be appreciated that a user's personality traits may be identified, not just with a current query, but based on past communications (e.g., return requests, complaints, other service requests, other queries, etc.) as well. Thus, in some embodiments, the personality traits determined for past communications may be stored and used to determine personality traits for the user with respect to subsequent queries. For example, if a past communication identified the user as being an extravert, and the current query is determined to indicate the user is open to new experiences, either or both personality traits may be utilized in the following steps of method 600. In some embodiments, a personality trait from the past may be weighted to be factored in to a different extent than the personality trait identified based on the current query. Accordingly, older determined personality traits may progressively be weighted less and less and time goes on.

At block 604, a set of candidate answers that are topically relevant to the query may be identified. By way of example, the classifier 112 of FIG. 1 may be utilized to identify one or more candidate answers to the query. In some embodiments, the discourse tree generated from the query may be provided to the classifier 112. As described above, the classifier 112 may have been previously trained using a training data set of example query/answer pairs to identify one or more answers relevant to the query.

At block 605, a respective emotion and a respective personality trait for each candidate answers of the set of candidate answers may be determined. In some embodiments, each of the set of candidate answers may be associated with a predefined personality trait and/or emotion. In some embodiments, the set of candidate answers may be classified as relating to one or more personality traits and/or one or emotions by using the personality trait classifier and/or the emotion classifier discussed above as part of a set of preprocessing tasks that are executed prior to receiving the query. In other embodiments, the autonomous agent application 108 may be configured to identify one or more personality traits and or one or more emotions for each candidate answer by submitting the candidate answer (or a discourse tree generated from the candidate answer) as input to the personality trait classifier and/or emotion classifier discussed above. Alternatively, the autonomous agent application 108 may identify a personality trait and/or emotion of the candidate answer using any suitable machine-learning model, decision tree, or list of predefined words discussed above. In some embodiments, the autonomous agent application 108 may identify one or more personality traits and/or one or more complementary emotions based on the emotion identified for the query and the complements data 120 or emotional state transition data 122 described in connection with FIG. 1.

At block 606, a respective score for each of the set of candidate answers may be generated based at least in part on the respective emotion. In some embodiments, the respective score may further be based at least in part on the respective personality trait. In some embodiments, the autonomous agent application 108 may score and/or rank the candidate answers based at least in part on a degree of similarity between the personality traits and/or emotions indicated by the candidate answer and the complementary personality traits and/or complementary emotions identified for the query. In some embodiments, a set of preferred emotions may be utilized to weigh the candidate answers based at least in part on indicating a transition to a preferred emotional state.

At block 607, a candidate answer may be selected from the set of candidate answers based at least in part on respective scores of the set of candidate answers. In some embodiments, a highest scored candidate may be selected and provided to the user in response to the query. It should be appreciated that, in some embodiments, candidate answers are not scored. Rather, a candidate answer may be selected based on it being associated with a personality trait and/or emotion determined by the autonomous agent application 108 to be complementary to the personality trait(s) of the user and/or the emotion determined for the query.

At block 608, output dialog may be presented to the user device based at least in part on the candidate answer selected. In some embodiments, the output dialog may provide a response to the query that complements the emotion with which the query was expressed and the personality trait of the user.

Figure 7:
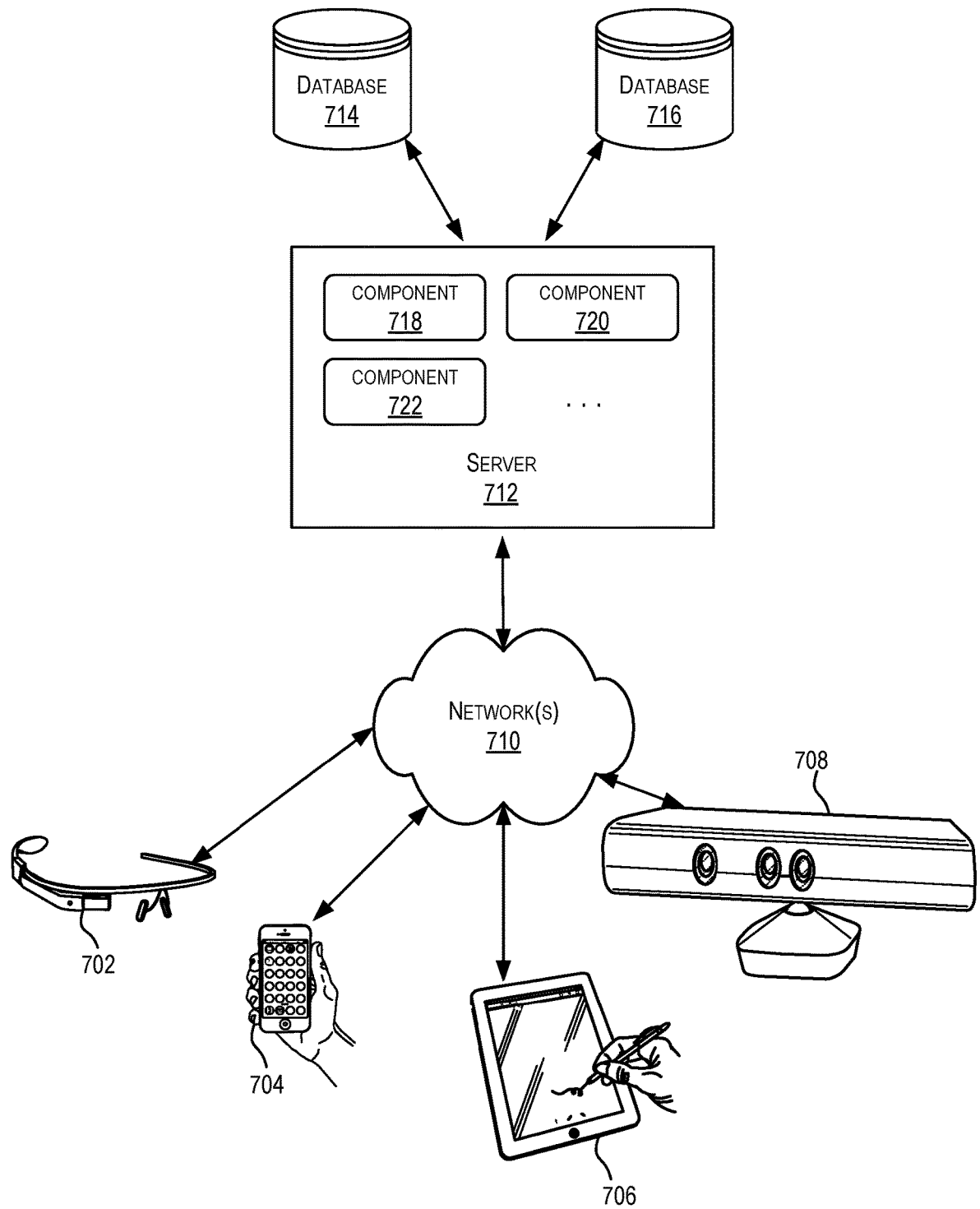
FIG. 7 depicts a simplified diagram of a distributed system for implementing one of the aspects, in accordance with at least one embodiment.

FIG. 7 depicts a simplified diagram of a distributed system 700 for implementing one of the aspects. In the illustrated aspect, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with client computing devices 702, 704, 706, and 708 via network(s) 710.

In various aspects, server 712 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other aspects, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The aspect shown in the figure is thus one example of a distributed system for implementing an aspect system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infrared network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various aspects, server 712 may be adapted to run one or more services or software applications described in the foregoing disclosure. For example, server 712 may correspond to a server for performing processing described above in accordance with an aspect of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of aspects, databases 714 and 716 may reside in a storage-area network (SAN). Similarly, any necessary files for performing the functions attributed to server 712 may be stored locally on server 712 and/or remotely, as appropriate. In one set of aspects, databases 714 and 716 may include relational databases, such as databases provided by Oracle, that are adapted to store, update, and retrieve data in response to SQL-formatted commands.

Figure 8:
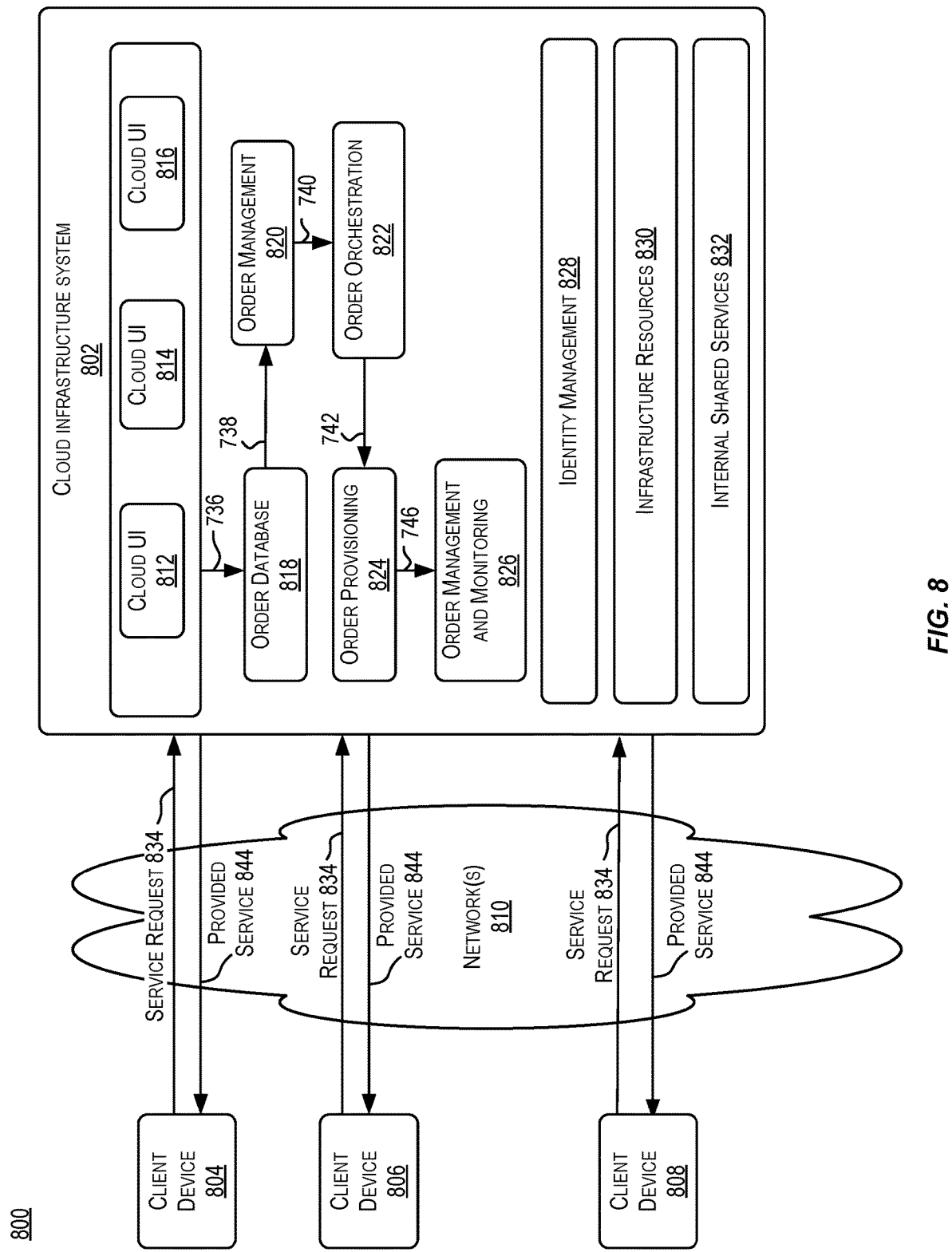
FIG. 8 is a simplified block diagram of components of a system environment by which services provided by the components of an aspect system may be offered as cloud services in accordance with an aspect.

FIG. 8 is a simplified block diagram of one or more components of a system environment 800 (e.g., a cloud infrastructure system) by which services provided by one or more components of an aspect system may be offered as cloud services, in accordance with an aspect of the present disclosure. In the illustrated aspect, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the aspect shown in the figure is only one example of a cloud infrastructure system that may incorporate an aspect of the invention. In some other aspects, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 810.

Cloud infrastructure system 802 may comprise one or more computers and/or servers that may include those described above for server 712 of FIG. 7.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some aspects, the services provided by cloud infrastructure system 802 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some aspects, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 802 may also include infrastructure resources 830 for providing the resources used to provide various services to customers of the cloud infrastructure system. In one aspect, infrastructure resources 830 may include pre-integrated and optimized combinations of hardware, such as servers, storage, and networking resources to execute the services provided by the PaaS platform and the SaaS platform.

In some aspects, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 802, and the like.

In one aspect, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain aspects, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 in which the customer intends to subscribe.

After an order has been placed by the customer, the order information is received via the cloud UIs, 812, 814 and/or 816.

At operation 836, the order is stored in order database 818. Order database 818 can be one of several databases operated by cloud infrastructure system 802 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain aspects, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by system environment 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain aspects, system environment 800 may include an identity management module 828. Identity management module 828 may be configured to provide identity services, such as access management and authorization services in system environment 800. In some aspects, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.). Identity management module 828 may also include the management of descriptive information about each customer and about how and by whom that descriptive information can be accessed and modified.

Figure 9:
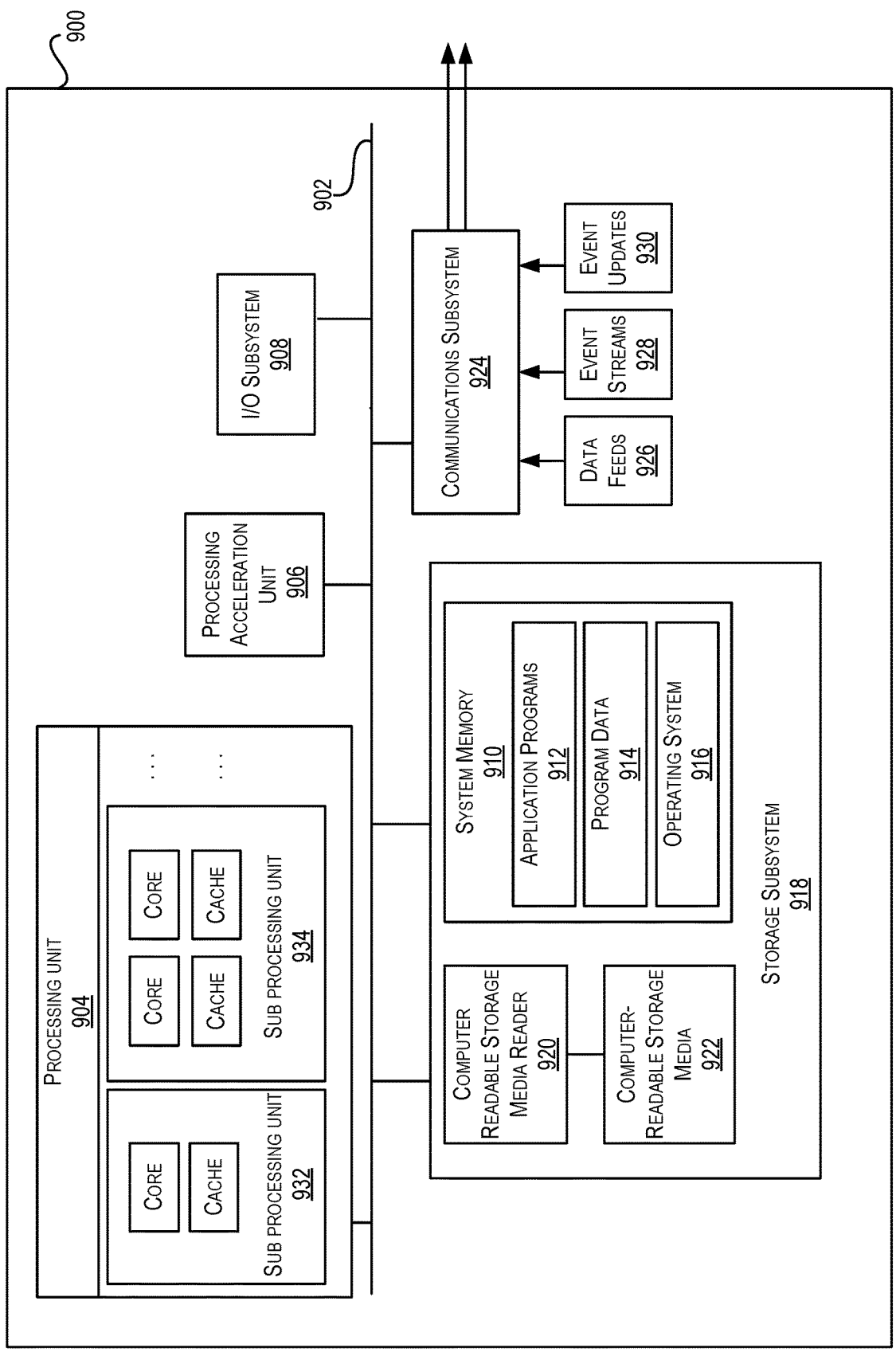
FIG. 9 illustrates an exemplary computer system, in which various aspects may be implemented.

FIG. 9 illustrates an exemplary computer system 900, in which various aspects may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain aspects, processing unit 904 may be implemented as one or more independent processing units 932 and/or 934 with single or multicore processors included in each processing unit. In other aspects, processing unit 904 may also be implemented as a quad-core processing unit formed by integrating two dual-core processors into a single chip.

In various aspects, processing unit 904 can execute a variety of programs in response to program code and can maintain multiple concurrently executing programs or processes. At any given time, some or all of the program code to be executed can be resident in processing unit 904 and/or in storage subsystem 918. Through suitable programming, processing unit 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some aspects. Software (programs, code modules, instructions) that when executed by a processor provide the functionality described above, may be stored in storage subsystem 918. These software modules or instructions may be executed by processing unit 904. Storage subsystem 918 may also provide a repository for storing data used in accordance with the present invention.

Storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 900.

By way of example, computer-readable storage media 922 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some aspects, communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 924 can provide wired network connectivity (e.g., Ethernet) in addition to or instead of a wireless interface.

In some aspects, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive unstructured data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for selecting output dialog to complement a user's personality and mood, the method comprising:

receiving, from a user device operated by a user, a first user utterance comprising a query;

determining an emotion with which the query was expressed based on generating a communicative discourse tree of the first user utterance and providing the communicative discourse tree to a first machine-learning model previously trained to identify the emotion based on input communicative discourse trees;

determining a personality trait of the user from the first user utterance based on the query providing the communicative discourse tree to a second machine-learning model previously trained to identify the personality trait based on input communicative discourse trees;

identifying a set of candidate answers that are topically relevant to the query, the set of candidate answers being identified based on executing the query against a data store of candidate answers;

determining a respective emotion and a respective personality trait for each candidate answer of the set of candidate answers;

generating a respective score for each of the set of candidate answers based on the respective emotion, the respective personality trait associated with each candidate answer, the emotion with which the query was expressed, and the personality trait of the user as determined from the query;

selecting an answer from the set of candidate answers based on respective scores of the set of candidate answers; and presenting output dialog based at least in part on the answer selected, wherein the output dialog provides a response to the query that complements the emotion with which the query was expressed and the personality trait of the user.

2. The method of claim 1, wherein the first machine-learning model was previously trained using a supervised learning technique and a data set of example communicative discourse trees for which emotion associations are known, and wherein determining the emotion with which the query was expressed further comprises receiving, from the first machine-learning model, an output identifying the emotion with which the query was expressed.

3. The method of claim 1, wherein determining the emotion with which the query was expressed further comprises:

obtaining a predefined list of words, wherein each word in the predefined list of words is associated with a predefined emotion;

identifying, from the query, a set of words from the predefined list of words;
identifying respective emotions corresponding to each of the set of predefined words; and
determining a particular emotion from the respective emotions that occurs most frequently; and
assigning the particular emotion as the emotion with which the query was expressed.

4. The method of claim 1, further comprising:
maintaining emotional state transition data indicating transitions between emotional states;
identifying, from the emotional state transition data, an initial emotional state corresponding to the emotion with which the query was expressed;
identifying, from the emotional state transition data, a preferred second emotional state; and
identifying, from the emotional state transition data, a response emotion corresponding to an action that, if performed, will likely transition the user from the initial emotional state to the preferred second emotional state.

5. The method of claim 4, wherein generating the respective score for each of the set of candidate answers is further based on the response emotion identified from the emotional state transition data.

6. The method of claim 1, further comprising:
obtaining a mapping indicating an association between a first emotion and a second emotion; and
identifying a complementary emotion that differs from the emotion with which the query was expressed, the complementary emotion to be used to provide the output dialog in response to the query, the complementary emotion being identified based on determining the second emotion from the mapping utilizing the first emotion, the first emotion corresponding to the emotion with which the query was expressed.

7. The method of claim 1, wherein the respective score for each of the set of candidate answers quantifies a degree to which the respective emotion and the respective personality trait associated with the answer complement the emotion and the personality trait determined from the query.

8. The method of claim 1, wherein the second machine-learning model was previously trained using a supervised learning technique and a data set of example communicative discourse trees for which personality trait associations are known, and wherein determining the personality trait for the user further comprises receiving, from the second machine-learning model, an output indicating the personality trait for the user.

9. A computing device comprising:
one or more processors; and
one or more memories storing executable instructions that, when executed by the one or more processors, cause the computing device to:
receive, from a user device operated by a user, a first user utterance comprising a query;
determine an emotion with which the query was expressed based on generating a communicative discourse tree of the first user utterance and providing the communicative discourse tree to a first machine-learning model previously trained to identify the emotion based on input communicative discourse trees;
determine a personality trait of the user based on providing the communicative discourse tree to a second machine-learning model previously trained to identify the personality trait based on input communicative discourse trees;
identify a set of candidate answers that are topically relevant to the query, the set of candidate answers being identified based on executing the query against a data store of candidate answers;
determine a respective emotion and a respective personality trait for each candidate answer of the set of candidate answers;
generate a respective score for each of the set of candidate answers based on the respective emotion, the respective personality trait associated with each candidate answer, the emotion with which the query was expressed, and the personality trait of the user as determined from the query;
select an answer from the set of candidate answers based on respective scores of the set of candidate answers; and
present output dialog based at least in part the answer selected, wherein the output dialog provides a response to the query that complements the emotion with which the query was expressed and the personality trait of the user.

10. The computing device of claim 9, wherein
the first machine-learning model was previously trained using a supervised learning technique and a data set of example communicative discourse trees for which emotion associations are known, and wherein determining the emotion with which the query was expressed further causes the computing device to receive, from the first machine-learning model, an output identifying the emotion with which the query was expressed.

11. The computing device of claim 9, wherein executing the instructions further causes the computing device to:
maintain emotional state transition data indicating transitions between emotional states based on being presented a communication corresponding to a particular emotion;
identify, from the emotional state transition data, an initial emotional state corresponding to the emotion with which the query was expressed;
identify, from the emotional state transition data, a preferred second emotional state; and
identify, from the emotional state transition data, a response emotion corresponding to an action that, if performed, will likely transition the user from the initial emotional state to the preferred second emotional state.

12. The computing device of claim 11, wherein generating the respective score for each of the set of candidate answers is further based on the response emotion identified from the emotional state transition data.

13. The computing device of claim 9, wherein executing the instructions further causes the computing device to:
obtaining a mapping indicating an association between a first emotion and a second emotion; and
identifying a complementary emotion that differs from the emotion with which the query was expressed, the complementary emotion to be used to provide the output dialog in response to the query, the complementary emotion being identified based on determining the second emotion from the mapping utilizing the first emotion, the first emotion corresponding to the emotion with which the query was expressed.

14. The computing device of claim 9, wherein the respective score for each of the set of candidate answers quantifies a degree to which the respective emotion and the respective personality trait associated with the answer complement the emotion and the personality trait determined from the query.

15. A non-transitory computer-readable storage medium storing computer-executable program instructions that, when executed by one or more processors of a computing device, cause the computing device to perform operations comprising:
receiving, from a user device operated by a user, a first user utterance comprising a query;
determining an emotion with which the query was expressed based on generating a communicative discourse tree of the first user utterance and providing the communicative discourse tree to a first machine-learning model previously trained to identify emotion based on input communicative discourse trees;
determining a personality trait of the user based on providing the communicative discourse tree to a second machine-learning model previously trained to identify the personality trait based on input communicative discourse trees;
identifying a set of candidate answers that are topically relevant to the query, the set of candidate answers being identified based on executing the query against a data store of candidate answers;
determining a respective emotion and a respective personality trait for each candidate answer of the set of candidate answers;
generating a respective score for each of the set of candidate answers based on the respective emotion, the respective personality trait associated with each candidate answer, the emotion with which the query was expressed, and the personality trait of the user as determined from the query;
selecting an answer from the set of candidate answers based on respective scores of the set of candidate answers; and
presenting output dialog based at least in part on the answer selected, wherein the output dialog provides a response to the query that complements the emotion with which the query was expressed and the personality trait of the user.

16. The non-transitory computer-readable storage medium of claim 15, wherein
the first machine-learning model was previously trained using a supervised learning technique and a data set of example communicative discourse trees for which emotion associations are known, and wherein determining the emotion with which the query was expressed further comprises receiving, from the machine-learning model, an output identifying the emotion with which the query was expressed.

17. The non-transitory computer-readable storage medium of claim 15, wherein determining the emotion with which the query was expressed further comprises:
obtaining a predefined list of words, wherein each word in the predefined list of words is associated with a predefined emotion;
identifying, from the query, a set of words from the predefined list of words;
identifying respective emotions corresponding to each of the set of predefined words; and
determining a particular emotion from the respective emotions that occurs most frequently; and
assigning the particular emotion as the emotion with which the query was expressed.

18. The non-transitory computer-readable storage medium of claim 15, wherein executing the program instructions further causes the computing device to perform operations comprising:
maintaining emotional state transition data indicating transitions between emotional states;
identifying, from the emotional state transition data, an initial emotional state corresponding to the emotion with which the query was expressed;
identifying, from the emotional state transition data, a preferred second emotional state; and
identifying, from the emotional state transition data, a response emotion corresponding to an action that, if performed, will likely transition the user from the initial emotional state to the preferred second emotional state, wherein generating the respective score for each of the set of candidate answers is further based on the response emotion identified from the emotional state transition data.

19. The non-transitory computer-readable storage medium of claim 15, wherein executing the program instructions further causes the computing device to perform operations comprising:
obtaining a mapping indicating an association between a first emotion and a second emotion; and
identifying a complementary emotion that differs from the emotion with which the query was expressed, the complementary emotion to be used to provide the output dialog in response to the query, the complementary emotion being identified based on determining the second emotion from the mapping utilizing the first emotion, the first emotion corresponding to the emotion with which the query was expressed.

20. The non-transitory computer-readable storage medium of claim 15, wherein the respective score for each of the set of candidate answers quantifies a degree to which the respective emotion and the respective personality trait associated with the answer complement the emotion and the personality trait determined from the query.

* * * * *

UNITED STATES PATENT AND TRADEMARK OFFICE
CERTIFICATE OF CORRECTION

PATENT NO. : 11,449,682 B2
APPLICATION NO. : 16/869013
DATED : September 20, 2022
INVENTOR(S) : Boris Galitsky It is certified that error appears in the above-identified patent and that said Letters Patent is hereby corrected as shown below:

On the Title Page

Column 1, under Applicant, Line 1, delete "international" and insert -- International --, therefor.

On page 3, Column 2, Item (56) under Other Publications, Line 11, delete "Chapters," and insert -- Chapter 5, --, therefor.

On page 5, Column 1, Item (56) under Other Publications, Line 37, delete "1 st" and insert -- 1st --, therefor.

On page 6, Column 1, Item (56) under Other Publications, Line 18, delete "forText" and insert -- for Text --, therefor.

On page 6, Column 2, Item (56) under Other Publications, Line 3, delete "ANLPWorkshop" and insert -- ANLP Workshop --, therefor.

In the Specification

In Column 8, Line 15, delete "and or" and insert -- and/or --, therefor.

In Column 10, Line 25, delete "and or" and insert -- and/or --, therefor.

In Column 12, Line 13, delete "(Internet" and insert -- (Internetwork --, therefor.

In the Claims

In Column 22, Line 28, in Claim 1, after "on" delete "the query", therefor.

In Column 25, Line 16, in Claim 15, after "identify" insert -- the --, therefor.

Signed and Sealed this
Fourteenth Day of March, 2023

Katherine Kelly Vidal
*Director of the United States Patent and Trademark Office*